US010728227B2

(12) United States Patent
Paz de Araujo

(10) Patent No.: US 10,728,227 B2
(45) Date of Patent: Jul. 28, 2020

(54) METHODS AND SYSTEMS FOR ENHANCED DATA-CENTRIC ENCRYPTION SYSTEMS USING GEOMETRIC ALGEBRA

(71) Applicant: X-Logos, LLC, Colorado Springs, CO (US)

(72) Inventor: Carlos A. Paz de Araujo, Colorado Springs, CO (US)

(73) Assignee: X-Logos, LLC, Colorado Springs, CO (US)

( * ) Notice: Subject to any disclaimer, the term of this patent is extended or adjusted under 35 U.S.C. 154(b) by 185 days.

(21) Appl. No.: 15/667,325

(22) Filed: Aug. 2, 2017

(65) Prior Publication Data

US 2018/0041481 A1 Feb. 8, 2018

Related U.S. Application Data

(60) Provisional application No. 62/370,183, filed on Aug. 2, 2016, provisional application No. 62/452,246, filed
(Continued)

(51) Int. Cl.
*H04L 29/06* (2006.01)
*G06F 7/72* (2006.01)
(Continued)

(52) U.S. Cl.
CPC .......... *H04L 63/0435* (2013.01); *G06F 7/722* (2013.01); *H04L 9/06* (2013.01);
(Continued)

(58) Field of Classification Search
CPC ..... H04L 63/0435; H04L 63/061; H04L 9/06; H04L 9/0656; H04L 9/0819;
(Continued)

(56) References Cited

U.S. PATENT DOCUMENTS 4,405,829 A 9/1983 Rivest et al.
5,220,606 A * 6/1993 Greenberg ............ H04L 9/3026
380/28
(Continued)

OTHER PUBLICATIONS

Min-sung Koh et al., A Highly Adaptive Novel Symmetric Encryption Method Using the Sylvester Equation, 2005 IEEE Military Communications Conference (Year: 2006).*
(Continued)

*Primary Examiner* — Noura Zoubair
*Assistant Examiner* — Mahabub S Ahmed
(74) *Attorney, Agent, or Firm* — Christopher P. Whitham; Samuel M. Freund; Cochran Freund & Young LLC

(57) ABSTRACT

Disclosed are methods and systems to encrypt and decrypt a data message using Geometric Algebra. The encrypt operation performed on a source computing device uses the geometric product (Clifford Product) of a multivector created from plain text/data of the data message with one or more other multivectors that carry encryption keys, the identity of the source and/or other data-centric information. The source computing device sends the encrypted message to a destination computing device. The decrypt operation performed on the destination computing devices recovers the original message multivector, and ultimately the original data message by employing geometric algebra operations such as multivector inverse, Clifford conjugate and others along with the geometric product. Various embodiments may employ a geometric product of the message and encryption/shared secret key, or various embodiments may utilize a geometric product "sandwich" and/or multivector based Sylvester's equation to increase the confusion and/or diffusion of the encryption system.

44 Claims, 8 Drawing Sheets

Related U.S. Application Data on Jan. 30, 2017, provisional application No. 62/483,227, filed on Apr. 7, 2017.

(51) Int. Cl.
  *H04L 9/08* (2006.01)
  *H04L 9/06* (2006.01)

(52) U.S. Cl.
  CPC .......... *H04L 9/0656* (2013.01); *H04L 9/0819* (2013.01); *H04L 9/0838* (2013.01); *H04L 63/061* (2013.01)

(58) Field of Classification Search
  CPC ... H04L 9/0838; H04L 9/0841; H04L 9/0844; H04L 9/0847; G06F 7/722
  USPC ........................................................ 713/171
  See application file for complete search history.

(56) References Cited

U.S. PATENT DOCUMENTS

| | | | |
|---|---|---|---|
| 5,412,729 A * | 5/1995 | Liu ...................... | H04L 9/0618 380/28 |
| 5,751,808 A | 5/1998 | Anshel et al. | |
| 6,853,964 B1 | 2/2005 | Rockwood et al. | |
| 6,961,427 B1 * | 11/2005 | Qiu ...................... | H04L 9/0668 380/262 |
| 8,452,975 B2 | 5/2013 | Futa et al. | |
| 8,515,058 B1 | 8/2013 | Gentry | |
| 8,719,324 B1 | 5/2014 | Koc et al. | |
| 9,083,526 B2 | 7/2015 | Gentry | |
| 9,716,590 B2 | 7/2017 | Gentry | |
| 9,813,243 B1 * | 11/2017 | Triandopoulos ........ | H04L 9/085 |
| 2002/0001383 A1 * | 1/2002 | Kasahara .............. | H04L 9/3093 380/30 |
| 2003/0223579 A1 | 12/2003 | Kanter et al. | |
| 2004/0105546 A1 * | 6/2004 | Chernyak ............. | H04L 9/3073 380/259 |
| 2005/0193012 A1 | 9/2005 | Matsayuma et al. | |
| 2005/0271203 A1 * | 12/2005 | Akiyama .............. | H04L 9/3093 380/30 |
| 2006/0036861 A1 * | 2/2006 | Chernyak ............. | H04L 9/0841 713/171 |
| 2006/0179489 A1 | 8/2006 | Mas Ribes | |
| 2007/0110232 A1 * | 5/2007 | Akiyama .............. | H04L 9/3026 380/30 |
| 2007/0297614 A1 | 12/2007 | Rubin | |
| 2008/0019511 A1 * | 1/2008 | Akiyama ................ | G06F 7/724 380/30 |
| 2008/0080710 A1 | 4/2008 | Harley et al. | |
| 2009/0136033 A1 | 5/2009 | Sy | |
| 2009/0161865 A1 * | 6/2009 | Lee ...................... | H04L 9/0637 380/38 |
| 2009/0185680 A1 * | 7/2009 | Akiyama .............. | H04L 9/3093 380/30 |
| 2009/0282040 A1 | 11/2009 | Callaghan et al. | |
| 2010/0226496 A1 * | 9/2010 | Akiyama .............. | H04L 9/3093 380/30 |
| 2010/0329447 A1 * | 12/2010 | Akiyama .............. | H04L 9/3093 380/28 |
| 2011/0200187 A1 * | 8/2011 | Ghouti .................. | H04L 9/3066 380/43 |
| 2012/0039473 A1 * | 2/2012 | Gentry .................... | H04L 9/008 380/277 |
| 2012/0151205 A1 * | 6/2012 | Raykova ................ | H04L 9/008 713/150 |
| 2012/0207299 A1 * | 8/2012 | Hattori .................... | H04L 9/008 380/30 |
| 2013/0028415 A1 * | 1/2013 | Takashima ............ | H04L 9/0847 380/44 |
| 2013/0322537 A1 | 12/2013 | Rossato et al. | |
| 2014/0140514 A1 | 5/2014 | Gentry | |
| 2014/0189792 A1 * | 7/2014 | Lesavich ................ | H04L 63/10 726/3 |
| 2015/0039912 A1 | 2/2015 | Payton et al. | |
| 2015/0098566 A1 * | 4/2015 | Takashima ............ | H04L 9/3073 380/44 |
| 2015/0100785 A1 | 4/2015 | Joye et al. | |
| 2015/0154406 A1 * | 6/2015 | Naehrig ................. | G16B 50/00 713/165 |
| 2015/0170197 A1 | 6/2015 | Smith et al. | |
| 2015/0172258 A1 * | 6/2015 | Komano ............... | H04L 9/0816 380/259 |
| 2015/0295712 A1 | 10/2015 | Veugen | |
| 2015/0358219 A1 * | 12/2015 | Kanda .................. | H04L 41/0896 709/224 |
| 2015/0381348 A1 | 12/2015 | Takenaka et al. | |
| 2016/0105402 A1 | 4/2016 | Soon-Shiong et al. | |
| 2016/0119119 A1 | 4/2016 | Calapodescu et al. | |
| 2016/0142208 A1 * | 5/2016 | Nguyen ................ | H04L 9/3093 380/30 |
| 2017/0324554 A1 * | 11/2017 | Tomlinson ............ | H04L 9/0618 |
| 2018/0183570 A1 * | 6/2018 | Zheng ...................... | G09C 1/00 |
| 2018/0241548 A1 * | 8/2018 | Dolev .................... | H04L 9/0656 |

OTHER PUBLICATIONS

Tatsuaki Okamoto1 et al., Fully Secure Functional Encryption with General Relations from the Decisional Linear Assumption, International Association for Cryptologic Research 2010 (Year: 2010).*

N. G. Marchuk, Tensor Products of Clifford Algebras, ISSN 10645624, Doklady Mathematics, 2013, vol. 87, No. 2, pp. 185-188. © Pleiades Publishing, Ltd., 2013. (Year: 2013).*

Koh et al., A Highly Adaptive Novel Symmetric Encryption Method Using the Sylvester Equation With an Application Example for Lossless Audio Compression, IEEE (Year: 2005).*

V. Simoncini, Computational Methods for Linear Matrix Equations, University Bologna, Italy (Year: 2013).*

Dr.M.Mohamed Sathik et al., Secret sharing scheme for data encryption based on polynomial coefficient, 2010 Second International conference on Computing, Communication and Networking Technologies (Year: 2010).*

Tatsuaki Okamotol et al., Fully Secure Functional Encryption with General Relations from the Decisional Linear Assumption, International Association for Cryptologic Research 2010 (Year: 2010).*

Zhenfu Cao, etal., New Public Key Cryptosystems Using Polynomials over Non-commutative Rings, Shanghai Jiao Tong University, Shanghai 200240, P. R. China (Year: 2007).*

N. G. Marchuk, Tensor Products of Clifford Algebras, ISSN 10645624, Doklady Mathematics, 2013, vol. 87, No. 2, pp. 185-188. © Pleiades Publishing, Ltd. (Year: 2013).*

Fau, et al., "Towards practical program execution over fully homomorphic encryption schemes", IEEE Computer Society, DOI 10.1109/3PGCIC, (2013), pp. 284-290.

Erkin et al., "Generating private recommendations efficiently using homomorphic encryption and data packing", In: IEEE transactions on information forensics and security, vol. 7, No. 3, Jun. 2012, pp. 1053-1066.

Chatterjee et al., "Searching and Sorting of Fully Homomorphic Encrypted Data on Cloud", IACR Cryptology ePrint Archive, Oct. 10, 2015, pp. 1-14.

Emmadi et al., "Updates on sorting of fully homomorphic encrypted data", 2015 International Conference on Cloud Computing Research and Innovation (ICCCRI), Oct. 27, 2015, 6 pages.

Wang, Licheng, et al., "Discrete logarithm based additively homomorphic encryption and secure data aggregation", Information Sciences, vol. 181, (2011), pp. 3308-3322.

The International Search Report and Written Opinion of the International Searching Authority, PCT/US2018/56154, dated Dec. 27, 2018, 21 pages.

The International Search Report and Written Opinion of the International Searching Authority, PCT/US2018/56156, dated Dec. 27, 2018, 20 pages.

The International Search Report and Written Opinion of the International Searching Authority, PCT/US2018/16000, dated Apr. 25, 2018, 13 pages.

(56) References Cited

OTHER PUBLICATIONS

The International Search Report and Written Opinion of the International Searching Authority, PCT/US2017/45141, dated Oct. 18, 2017, 8 pages.
The International Search Report and Written Opinion of the International Searching Authority, PCT/US2018/26305, dated Jul. 3, 2018, 8 pages.
Non-Final Office Action, entitled, "Methods and Systems for Enhanced Data-Centric Additive Homomorphic Encryption Systems Using Geometric Algebra", dated Jan. 15, 2020.
Non-Final Office Action, for "Methods and Systems for Enhanced Data-Centric Scalar Muliplicative Homomorphic Encryption Systems Using Geometric Algebra", dated Feb. 6, 2020.
Extended European Search Report, PCT/US2017/045141, dated Nov. 22, 2019, 8 pages.
Kumar, Mohit, et al, "Efficient Implementation of Advanced Ecryption Standard (AES) for ARM based Platforms", 1st Int'l Conf. on Recent Advances in Information Technology, RAIT-20121, 2012, 5 pages.
Hitzer, Eckhard, et al, "Applications of Clifford's Geometric Algebra", Adv. Appl. Clifford Algebras 23, (2013), DOI 10.1007, pp. 377-404.

\* cited by examiner

400 FLOW CHART OF SOURCE DEVICE SYMMETRIC KEY & CRYPTOTEXT MASKING OPERATION FOR A CORE ENCRYPTION EMBODIMENT

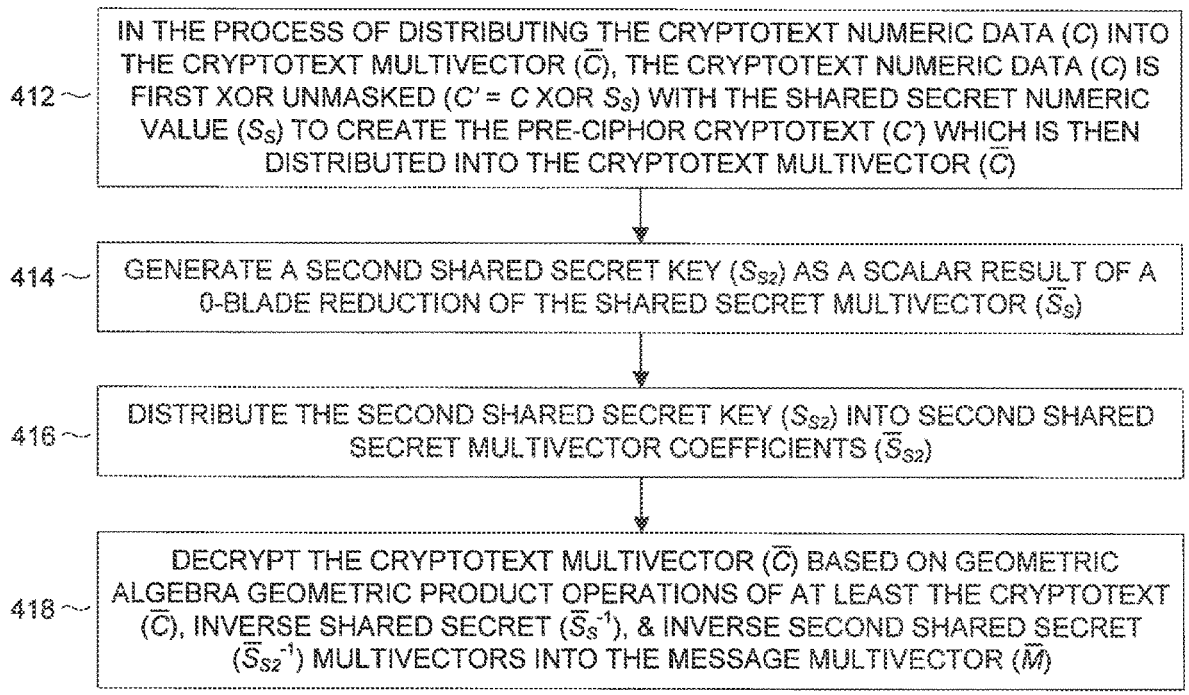
FIG. 4B  410 FLOW CHART OF DESTINATION DEVICE SYMMETRIC KEY & CRYPTOTEXT MASKING OPERATION FOR A CORE ENCRYPTION EMBODIMENT 700 Block diagram for extracting/generating/obtaining a second shared secret key from the original shared secret multivector

METHODS AND SYSTEMS FOR ENHANCED DATA-CENTRIC ENCRYPTION SYSTEMS USING GEOMETRIC ALGEBRA

CROSS REFERENCE TO RELATED APPLICATIONS

This application is based upon and claims priority to U.S. provisional application Ser. No. 62/370,183, filed Aug. 2, 2016, entitled "Methods and Systems for Enhanced Data-Centric Encryption Systems Using Geometric Algebra;" Ser. No. 62/452,246, filed Jan. 30, 2017, entitled "Methods and Systems for Enhanced Data-Centric Encryption Additive Homomorphic Systems Using Geometric Algebra;" and Ser. No. 62/483,227, filed Apr. 7, 2017, entitled "Methods and Systems for Enhanced Data-Centric Scalar Multiplicative Homomorphic Encryption Systems Using Geometric Algebra;" all of which are specifically incorporated herein by reference for all that they disclose and teach.

BACKGROUND OF THE INVENTION

In the last several decades, personal computers and other consumer computing devices, such has hand-held devices and smart phones, have become ubiquitous among the general public. As the proliferation of personal computers and other computing devices became prevalent, the usefulness of the computers and other computing devices was increased by interconnected communications between different computers/computing, devices via various electronic networking communications systems. With the advent of the publicly accessible Internet and the establishment of the World Wide Web (WWW) for common communications between computers and/or other computing devices on the Internet, it became common for private identification and financial information to be transferred over the publicly accessible Internet. To ensure that the private information is not accessed by parties that are not intended to be privy to the private information, various encryption techniques have been applied to the private data being transferred over the Internet. As data storage has become accessible over networking technologies, including over the publicly accessible Internet, it has also become prudent to store sensitive data in an encrypted format.

Modern encryption employs mathematical techniques that manipulate positive integers or binary bits. Asymmetric encryption, such as RSA (Rivest-Shamir-Adleman), relies on number theoretic one-way functions that are predictably difficult to factor and can be made more difficult with an ever increasing size of the encryption keys. Symmetric encryption, such as DES (Data Encryption Standard) and AES (Advanced Encryption Standard), uses bit manipulations within registers to shuffle the cryptotext to increase "diffusion" as well as register based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the encryption process by spreading the influence of each piece of the unencrypted (plain) data across several pieces of the encrypted (cryptotext) data. Consequently, an encryption system that has a high degree of diffusion will typically change several characters of the encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the encrypted (cryptotext) data. Accordingly, an encryption system that has a high degree of confusion would entail a process that drastically changes the unencrypted (plain) data into the encrypted (cryptotext) data in a way that, even when an attacker knows the operation of the encryption method (such as the public standards of RSA, DES, and/or AES), it is still difficult to deduce the encryption key.

SUMMARY OF THE INVENTION

An embodiment of the present invention may comprise a method for the encrypted transfer of numeric message data (M) from a source computing device to a destination computing device, the method comprising: distributing by the source computing device the numeric message data (M) into coefficients of a message multivector ($\overline{M}$) in accord with a message data coefficient distribution algorithm that is known to both the source computing device and the destination computing device; distributing by the source computing device a shared secret numeric value ($S_S$) into coefficients of a shared secret multivector ($\overline{S}_S$) in accord with a shared secret coefficient distribution algorithm that is known to both the source computing device and the destination computing device, the shared secret numeric value ($S_S$) being known or knowable to both the source computing device and the destination computing device but is kept secret from other devices not intended to have access to the numeric message data; encrypting by the source computing device a cryptotext multivector ($\overline{C}$) as a function of at least one Geometric Algebra geometric product operation on the message multivector ($\overline{M}$) and the shared secret multivector ($\overline{S}_S$); sending by the source computing device the cryptotext multivector ($\overline{C}$) to the destination computing device; receiving by the destination computing device the cryptotext multivector ($\overline{C}$) sent by the source computing device; distributing by the destination computing device the shared secret numeric value ($S_S$) into the shared secret multivector ($\overline{S}_S$) in accord with the shared secret coefficient distribution algorithm; decrypting by the destination computing device the cryptotext multivector ($\overline{C}$) as a function of at least one Geometric Algebra geometric product operation on the cryptotext multivector ($\overline{C}$) and an inverse ($\overline{S}_S^{-1}$) of the shared secret multivector ($\overline{S}_S$) back into the message multivector ($\overline{M}$); and converting by the destination computing device the message multivector ($\overline{M}$) into the message numeric data (M) in accord with reverse operation of the message data coefficient distribution algorithm.

An embodiment of the present invention may further comprise a method for encrypting numeric message data (M) on a source computing device in order to facilitate transfer of encrypted data from the source computing device to a destination computing device, the method comprising: distributing by the source computing device the numeric message data (M) into coefficients of a message multivector ($\overline{M}$) in accord with a message data coefficient distribution algorithm that is known to both the source computing device and the destination computing device; distributing by the source computing device a shared secret numeric value ($S_S$) into coefficients of a shared secret multivector ($\overline{S}_S$) in accord with a shared secret coefficient distribution algorithm that is known to both the source computing device and the destination computing device, the shared secret numeric value $(S_S)$ being known or knowable to both the source computing device and the destination computing device but is kept secret from other devices not intended to have access to the numeric message data; encrypting by the source computing device a cryptotext multivector $(\overline{C})$ as a function of at least one Geometric Algebra geometric product operation on the message multivector $(\overline{M})$ and the shared secret multivector $(\overline{S}_S)$; and sending by the source computing device the cryptotext multivector $(\overline{C})$ to the destination computing device.

An embodiment of the present invention may further comprise a method for decrypting a cryptotext multivector $(\overline{C})$ back into numeric message data (M) on a destination computing device in order to facilitate transfer of encrypted data from a source computing device to the destination computing device, the method comprising: receiving by the destination computing device the cryptotext multi vector $(\overline{C})$ sent by the source computing device; distributing by the destination computing device the shared secret numeric value $(S_S)$ into the shared secret multivector $(\overline{S}_S)$ in accord with the shared secret coefficient distribution algorithm; decrypting by the destination computing device the cryptotext multivector $(\overline{C})$ as a function of at least one Geometric Algebra geometric product operation on the cryptotext multivector $(\overline{C})$ and an inverse $(\overline{S}_S^{-1})$ of the shared secret multivector $(\overline{S}_S)$ back into the message multivector $(\overline{M})$; and converting by the destination computing device the message multivector $(\overline{M})$ into the message numeric data (M) in accord with reverse operation of the message data coefficient distribution algorithm.

An embodiment of the present invention may further comprise a Enhanced Data-Centric Encryption (EDCE) system for the encrypted transfer of numeric message data (M), the EDCE system comprising: a source computing device, wherein the source computing device further comprises: a source numeric message distribution subsystem that distributes the numeric message data (M) into coefficients of a message multivector $(\overline{M})$ in accord with a message data coefficient distribution algorithm that is known to both the source computing device and the destination computing device; a source numeric shared secret distribution subsystem that distributes a shared secret numeric value $(S_S)$ into coefficients of a shared secret multivector $(\overline{S}_S)$ in accord with a shared secret coefficient distribution algorithm that is known to both the source computing device and the destination computing device, the shared secret numeric value $(S_S)$ being known or knowable to both the source computing device and the destination computing device but is kept secret from other devices not intended to have access to the numeric message data; a source encryption subsystem that encrypts a cryptotext multivector $(\overline{C})$ as a function of at least one Geometric Algebra geometric product operation on the message multivector $(\overline{M})$ and the shared secret multivector $(\overline{S}_S)$; a source send subsystem that sends the cryptotext multivector $(\overline{C})$ to the destination computing device; and a destination computing device, wherein the destination computing device further comprises: a destination receive subsystem that receives the cryptotext multivector $(\overline{C})$ sent by the source computing device; a destination numeric shared secret distribution subsystem that distributes the shared secret numeric value $(S_S)$ into the shared secret multivector $(\overline{S}_S)$ in accord with the shared secret coefficient distribution algorithm; a destination decrypt subsystem that decrypts the cryptotext multivector $(\overline{C})$ as a function of at least one Geometric Algebra geometric product operation on the cryptotext multivector $(\overline{C})$ and an inverse $(\overline{S}_S^{-1})$ of the shared secret multivector $(\overline{S}_S)$ back into the message multivector $(\overline{M})$; and a destination convert multivector subsystem that converts the message multivector $(\overline{M})$ into the message numeric data (M) in accord with reverse operation of the message data coefficient distribution algorithm.

An embodiment of the present invention may further comprise a Enhanced Data-Centric Encryption (EDGE) source computing device for encrypting numeric message data (M) in order to facilitate transfer of encrypted data from the EDCE source computing device to a destination computing device, the EDCE source computing device comprising: a source numeric message distribution subsystem that distributes the numeric message data (M) into coefficients of a message multivector $(\overline{M})$ in accord with a message data coefficient distribution algorithm that is known to both the EDCE source computing device and the destination computing device; a source numeric shared secret distribution subsystem that distributes a shared secret numeric value $(S_S)$ into coefficients of a shared secret multivector $(\overline{S}_S)$ in accord with a shared secret coefficient distribution algorithm that is known to both the EDCE source computing device and the destination computing device, the shared secret numeric value $(S_S)$ being known or knowable to both the EDGE source computing device and the destination computing device but is kept secret from other devices not intended to have access to the numeric message data; a source encryption subsystem that encrypts a cryptotext multivector $(\overline{C})$ as a function of at least one Geometric Algebra geometric product operation on the message multivector $(\overline{M})$ and die shared secret multivector $(\overline{S}_S)$; and a source send subsystem that sends the cryptotext multivector $(\overline{C})$ to the destination computing device.

An embodiment of the present invention may further comprise a Enhanced Data-Centric Encryption (EDCE) destination computing device for decrypting a cryptotext multivector $(\overline{C})$ back into numeric message data (M) in order to facilitate transfer of encrypted data from a source computing device to the EDCE destination computing device, the EDCE destination computing device comprising: a destination receive subsystem that receives the cryptotext multivector $(\overline{C})$ sent by the source computing device; a destination numeric shared secret distribution subsystem that distributes the shared secret numeric value $(S_S)$ into the shared secret multivector $(\overline{S}_S)$ in accord with the shared secret coefficient distribution algorithm; a destination decrypt subsystem that decrypts the cryptotext multivector $(\overline{C})$ as a function of at least one Geometric Algebra geometric product operation on the cryptotext multivector $(\overline{C})$ and an inverse $(\overline{S}_S^{-})$ of the shared secret multivector $(\overline{S}_S)$ back into the message multivector $(\overline{M})$; and a destination convert multivector subsystem that converts the message multivector $(\overline{M})$ into the message numeric data (M) in accord with reverse operation of the message data coefficient distribution algorithm.

BRIEF DESCRIPTION OF THE DRAWINGS

In the drawings,

FIG. 4B is a flow chart of the destination computing device symmetric key and cryptotext masking operation for an embodiment.

DETAILED DESCRIPTION OF THE EMBODIMENTS

Figure 1:
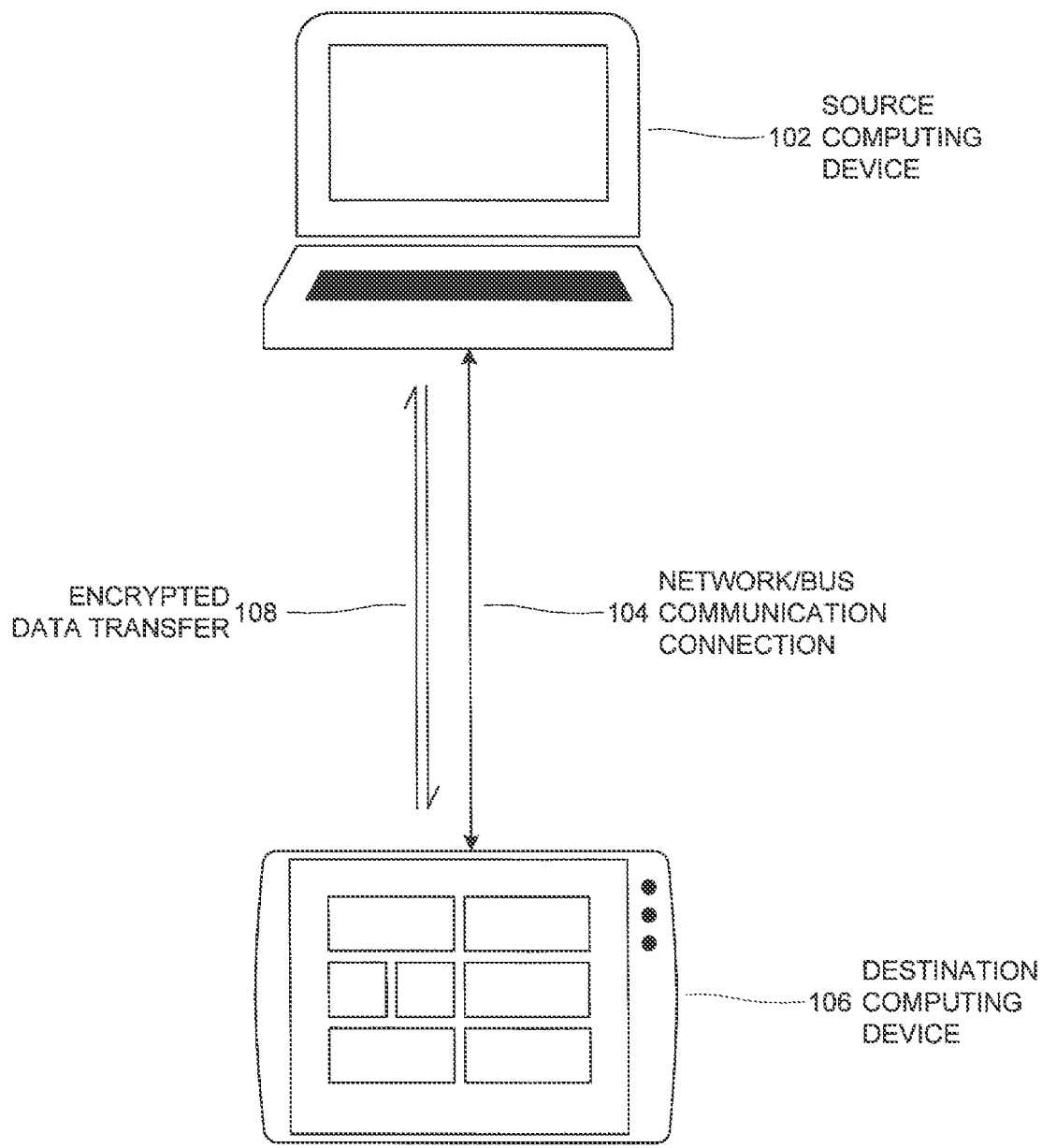
FIG. 1 is a block diagram of the hardware implementation for an embodiment.

An embodiment may advantageously utilize Geometric Algebra to provide the encryption and decryption of numeric messages that are to be transmitted through, and possibly have stored by, an intermediary computing system (e.g., the broad-lased computing system currently, and commonly, referred to as the Cloud, or cloud computing). An embodiment of the Geometric Algebra encryption/decryption system that performs the encryption/decryption functions of transferring data securely using Geometric Algebra based encryption/decryption from a source/sender system to a destination/receiver system may be referred to as an Enhanced Data-Centric Encryption (EDGE) system.

Geometric Algebra is an area of mathematics that describes the geometric interaction of vectors and other objects in a context intended to mathematically represent physical interactions of objects in the physical world. The use of Geometric Algebra for cryptography represents a new, manmade use of Geometric Algebra for a purpose entirely outside of the natural basis of Geometric Algebra for representing physical interactions of objects in the real, physical, word. As used herein, this area of mathematics encompasses Geometric Algebra, Conformal Geometric Algebra and Clifford Algebra (referred to collectively herein as "Geometric Algebra"). Generally, Geometric Algebra defines the operations, such as geometric product, inverses and identities, which facilitate many features of embodiments of the example EDGE system embodiments disclosed herein. Further, Geometric Algebra allows for the organization and representation of data into the "payload" of a multivector where the data in the payload may represent, for example, plaintext, cryptotext, or identifying signatures. Consequently, embodiments of the EDCE system make beneficial use of Geometric Algebra properties to provide encryption and decryption operations in a relatively computationally simplistic manner while still providing robust security for both data in motion and data at rest (e.g., data stored in the Cloud).

When encrypted data is transferred through an intermediary computing system, such as is done with cloud based computing, the encrypted data values may be stored on the intermediary computing system until such time a user wants or is attached to the network to allow delivery of the encrypted data value from the source computing device via the intermediary computing system. Alternatively, the encrypted data values may be immediately forwarded to a destination computing device by the intermediary computing system as soon as the subject encrypted data values are received by the intermediary computing system. However, as one skilled in the art will recognize, the process of receiving the encrypted data values at the intermediary computing system inherently includes storing the encrypted data values at the intermediary computing system even if only fleetingly in an immediately used and erased Random Access Memory (RAM) location or operational register location of a computational subsystem of the intermediary computing system.

Embodiments of EDGE system embodiments may be comprised of functional blocks, each of which may be tailored as described in more detail below according to objectives for scope, capability and security. The following sections provide a mathematical and numerical description of these functional blocks.

In order to help minimize the potential confusion of the complex subject matter herein, the descriptions below have been split up to separately cover foundational various topics regarding embodiments of an EDGE system. In view of that, Section 1 provides a general description of embodiments of the foundational operations of an EDGE system. Section 2 provides additional descriptions of embodiments of the foundational EDGE system, including the packing of information into multivectors the encryption and decryption of such multivectors and the unpacking to recover the original information. Appendix A provides a Geometric Algebra. Overview. Generally, in this description, as is the typical convention, for particular examples of operations, Alice and Bob are used for the sending/source and receiving/destination entities, respectively. Thus, the arrangement of the disclosure may be summarized as follows:

Section 1: General EDGE Message Encryption/Decryption
  A. Hardware Implementation for EDGE Embodiments (FIG. 1)
  B. General EDGE Operational Flow Charts (FIGS. 2-4)
Section 2: Additional Descriptions of EDGE Message Encryption/Decryption
  A. Packing and unpacking multivectors
    1) Text to number
    2) Number to text
    3) Multivector Data Structure
    4) Number to multivector
    5) Multivector to number
  B. Shared Secret
  C. Cryptotext creation
  D. Decryption
  E. EDCE Flow Chart (FIGS. 5-6)
  F. Symmetric Key Pair Encryption/Decryption from 0-Blade Reduction Operation (FIG. 7)
    0-Blade Reduction Operation
    Geometric Algebra Encryption Primitives
    Numerical Examples for encryption and decryption with double shared secret in 3 dimensions
  G. An Unbreakable Primitive Using Geometric Algebra and Arithmetic Functions
    Example with secret sharing and 3D multivectors
  Appendix A: Geometric Algebra Overview
Section 1: General EDCE Message Encryption/Decryption With the arrival of the interact and many forms of mobile devices, the volume of encrypted data is growing exponentially. Portable devices like "thumb drives," "smart cards" and Solid State Disks (SSDs) contain both plain text and or encrypted "passive" data storage. Passive data storage is found on the tiny devices for the Internet of Things (IoT) as well as the large memories in server farms.

When data leaves storage, when it is in motion, it is even more vulnerable to attack. Current encryption techniques have not evolved alongside network security infrastructure and they are not well suited for the sheer volume of data in motion. As we move towards "cloud computing," as mobile devices move us towards "perimeter-less" network security, the industry is moving away from trusting just the security of networks, servers or applications and focusing toward data-centric encryption. With data-centric encryption and authentication there are controls that are traveling with the data rather than just happening at the application layer or the final destination in a network.

However, the fluidity of this data in motion stalls with the computationally intensive mathematics that remain at the heart of current encryption infrastructures. Ciphers such as RSA (Rivest-Shamir-Adieman), DES (Data Encryption Standard) and/or AES (Advanced Encryption Standard) are little more than static "machinery" that bogs down communication efficiency. The actual problem is much bigger. How can robust security be provided when:

a) End-point computational resources are limited (e.g., the Internet of Things IoT).
b) Encryption/decryption must be near-real time
c) Authentication of the source and destination must be continuously reasserted An embodiment may be described as enhanced data-centric encryption, or EDGE. Compared to incumbent encryption schemes, EDGE is computationally simplistic while providing robust security over the span of the communication channel. EDGE security is scalable from tiny embedded IoT (Internet of Things) devices up to server farms. EDGE functionality enables many cipher schemes that show speed and bandwidth advantages over current methods. One aspect of EDGE that provides speed enhancement in the encryption/decryption of data is that the EDGE encryption/decryption may be implemented using basic arithmetic operations of addition, subtraction, multiplication, and division. Notably, EDGE does not require a complex operation to select a large prime number, to calculate a logarithm function, to calculate a natural logarithm function, and/or to calculate other complex and computationally intensive mathematical functions (i.e., prime numbers, logarithms, natural logarithms, and/or other complex mathematical Operations are not required in the Geometric Algebra calculations disclosed herein).

A central feature of the various embodiments is the use of Geometric Algebra, an area of mathematics that has not been utilized before in encryption. Geometric Algebra as used herein is an area of mathematics that encompasses Geometric Algebra, Conformal Geometric Algebra and Clifford Algebra (collectively herein, "Geometric Algebra"). Geometric Algebra allows for the organization and representation of data into the "payload" of a multivector where the data may be plaintext, cryptotext, or signatures, for example. Geometric Algebra defines the operations, such as geometric product, inverses and identities, which are the enablers of encryption/decryption calculations of various embodiments.

Multivectors are simply the additive combination of a scalar, a vector, a bi-vector and so forth up to an n-dimension vector. However, the unit vectors follow the algebraic structure of quaternions (Hamilton) and non-commutative algebra (Grassman). These two types of algebra allowed Clifford to conceive of the Geometric Product which is used by the various embodiments as one of the "primitive" functions of the embodiments of EDCE systems.

An example of a two-dimension (2D) multivector A that includes a scalar and a vector is:

$$\overline{A} = a_0 + a_1\overline{e}_1 + a_2\overline{e}_2 + a_{12}\overline{e}_{12}$$

where $\overline{e}_i$ is a unit vector along the i-axis and $\overline{e}_{12}$ represents the orientation of the area created by $a_{12}$. The operations of Geometric Algebra on multivectors are discussed more fully in "Appendix A" herein, below, but some general observations may be helpful to the description of the various embodiments disclosed below. First, each of the $a_i$ values in the multivector $\overline{A}$ above may be "packed" with information and each $a_i$ value may range from zero to very large (e.g., >256,000 bits or an entire message). Secondly, the inverse of $\overline{A}$ when multiplied by $\overline{A}$ yields unity, or:

$$\overline{A}\overline{A}^{-1} = 1$$

Thus, if a second multivector $\overline{B}$ is created and the geometric product $\overline{AB}$ is transmitted then the destination can recover $\overline{B}$ through:

$$\overline{A}\overline{A}^{-1}\overline{B} = \overline{B}$$

For the various embodiments, the "payload" may be packed in the values of the scalars and coefficients of the multivector elements, To ensure that EDCE systems may perform properly, it is necessary to have some limitations on the coefficient values chosen for the multivectors. For instance, the Rationalize operation on multivectors yields zero when all multivector coefficients are equal. Such multivectors having all equal coefficients have no inverse and the geometric product of such multivectors having all equal coefficients with another multivector has no inverse. As discussed in more detail below, the decryption methodology for EDCE systems utilize the inverse of the cryptotext multivector being decrypted and of the security keys) multivector to perform the decryption. Therefore, the cryptotext multivector being decrypted should not have all equal value coefficients. One means to ensure that the cryptotext multivector being decrypted does not have all equal value coefficients is to have the packing/coefficient distribution method ensure that not all coefficients are equal to each other (i.e., at least one coefficient should be different than the other coefficients) when creating the shared security multivector(s) and the data message multivectors. For an embodiment of the EDCE that simply transfers the data message, ensuring that that not all coefficients are equal to each other when creating the shared security multivector(s) and the data message multivectors will ensure that the cryptotext multivector to be decrypted will not have all equivalent coefficients.

Additionally, separate multivectors may be encoded for many purposes, such as a shared secret (defined below), authentication information, and timestamps. In addition to the encryption and decryption of a message, the EDCE multivector format and Geometric Algebra foundation of an EDGE embodiment may enable a single transmission to contain far more than just cryptotext, including dummy data to increase encryption security, command instructions for additional operations, and/or configuration data for the additional operations.

A. Hardware Implementation for EDCE Embodiments (FIG. 1)

FIG. 1 is a block diagram 100 of the hardware implementation for an embodiment. A first computing device 102 is connected over an electronic network/bus connection 104 to a second computing device 106. In the embodiment shown in FIG. 1, the first computing device 102 acts as the source device 102 that sends the encrypted message 108 over the network/bus connection 104. The second computing device 106 acts as the destination device 106 that receives the encrypted message 108 from the network/bus connection 104. Generally, communications, including encrypted communications, are bi-directional such that the first 102 and second 106 computing devices may change roles as the source device 102 and destination device 106 as is necessary to accommodate the transfer of data back and forth between the first 102 and second 106 computing devices.

Further, as shown in FIG. 1, the first computing device 102 appears to be a laptop computer and the second computing device 106 appears to be a tablet device. Generally, any computing device capable of communication over any form of electronic network or bus communication platform may be one, or both of the first 102 and second 106 computing devices. Further, the first 102 and second computing devices 106 may actually be the same physical computing device communicating over an internal bus connection 104 with itself, but still desiring encrypted communication to ensure that an attacker cannot monitor the internal communications bus 104 to obtain sensitive data communications in an unencrypted format.

Various embodiments may implement the network/bus communications channel 104 using any communications channel 104 capable of transferring electronic data between the first 102 and second 106 computing devices. For instance, the network/bus communication connection 104 may be an Internet connection routed over one or more different communications channels during transmission from the first 102 to the second 106 computing devices. Likewise, the network bus communication connection 104 may be an internal communications bus of a computing device, or even the internal bus of a processing or memory storage Integrated Circuit (EC) chip, such as a memory chip or a Central Processing Unit (CPU) chip. The network/bus communication channel 104 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the first 102 and/or second 106 computing devices. The first 102 and/or second 106 computing devices may each be a computer or computer system, or any other electronic devices device capable of performing the communications and computations of an embodiment. The first 102 and second 104 computing devices may include, but are not limited to: a general purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102 and second 106 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMS), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

B. General EDGE Operational Flow Charts (FIGS. 2-4)

Figure 2:
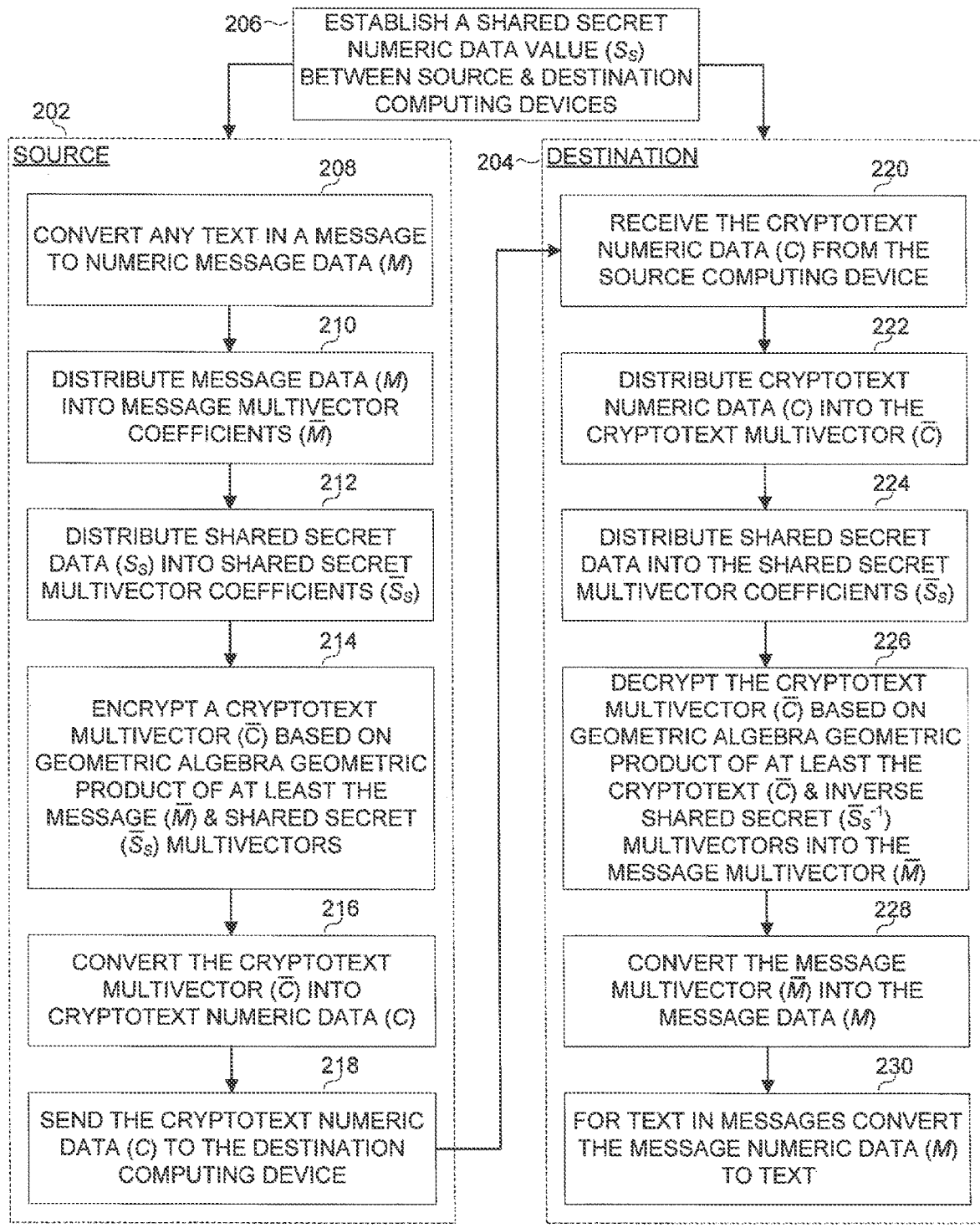
FIG. 2 is a flow chart of the general operation for an embodiment.

FIG. 2 is a flow chart 200 of the general operation for an embodiment. At process 206 a shared secret numeric data value ($S_S$) is shared between the source 202 and destination 204. The various embodiments may share the shared secret numeric data value ($S_S$) between the source 202 and destination 204 via any means desired by the users. To ensure the shared secret numeric data value ($S_S$) is kept secret, it is likely that some type of handshaking/setup encrypted key transfer mechanism will be desired to share the shared secret numeric data value ($S_S$). For example, the shared secret numeric data value ($S_S$) may be shared between the source 202 and destination 204 by means including, but not limited to: pre-conditioning the source 202 computing device and the destination 204 computing device with the shared secret numeric value ($S_S$), a standard public/private key exchange technique, RSA (Rivest-Shamir-Adlernan) key exchange, and/or Diffie-Hellman key exchange (disclosed in more detail herein, below), Further, the original shared secret may be an alphanumeric string in ASCII (American Standard Code for Information Exchange) or another encoding protocol that is converted to a numeric value based on the associated encoding protocol, such as: ASCII, other English language/alphabetic coding systems, foreign language encoding for non-alphabetic languages (e.g., katakana for Japanese), or even pure symbol to numeric values such as for emoji's. However, both the source 202 and destination 204 need to know and use the same alphanumeric text conversion into a numeric value process to ensure that results of both the source 202 and the destination 204 are the same.

At process 208, the source 202 converts any alphanumeric text in the message into numeric message data (M) based on the alphanumeric encoding protocol (e.g., ASCII, other English language/alphabetic coding systems, foreign language encoding for non-alphabetic languages (e.g., katakana for Japanese), or even pure symbol to numeric values such as for emojii's) of the original text. Again, both the source 202 and destination 204 need to know and use the same alphanumeric text conversion into a numeric value process to ensure that results of both the source 202 and the destination 204 are the same. If the message data is already in numeric form, it is not necessary to perform process 208 as the original numeric message data (M) may be used as is. The various embodiments may perform the encryption process with numeric Message data (M) that is, but are not limited to: positive numbers, negative numbers, zero, integer numbers, and/or real numbers. At process 210, the source 202 distributes the numeric message data (M) into message multivector ($\overline{M}$) coefficients. The encryption system will work with just one non-zero message multivector ($\overline{M}$)

coefficient, but, the more non-zero message multivector ($\overline{M}$) coefficients there are, the stronger the encryption will become, so it is desirable to have more than one non-zero message multivector ($\overline{M}$) coefficient. At process 212, the source 202 distributes shared secret numeric value ($S_S$) into shared secret multivector ($\overline{S}_S$) coefficients. Again, the encryption system will work with just one non-zero shared secret multivector ($\overline{S}_S$) coefficient, but, the more non-zero shared secret multivector ($\overline{S}_S$) coefficients there are, the stronger the encryption will become, so, again, it is desirable to have more than one non-zero shared secret multivector ($\overline{S}_S$) coefficient. One skilled in the art will recognize that there are many approaches for distributing numeric data into several coefficients of a multivector (see herein, below for disclosure of some example packing/distribution methods). The primary requirement for the distribution process from the numeric values of the message (M) and the shared secret ($S_S$) to the multivector coefficient values ($\overline{M}$ and $\overline{S}_S$) is that the source 202 and the destination 204 both know the processes 210/222 and 212/224 such that the destination 204 can reconstruct the original message (M). As long as it is known to both the source 202 and the destination 204, the distribution of numeric data to multivector coefficients may be performed differently between the message (M) and the shared secret ($S_S$). Further, the various embodiments may perform the encryption process with multi-vector coefficient values for both the message ($\overline{M}$) and shared and ($\overline{S}_S$) that are, but are not limited to: positive numbers, negative numbers, zero, integer numbers, and/or real numbers.

Again, for the various embodiments, the "payload" may be packed in the values of the scalars and coefficients of the multivector elements. To ensure that EDGE systems may perform properly, it is necessary to have some limitations on the coefficient values chosen for the multivectors. For instance, the Rationalize operation on multivectors yields zero when all multivector coefficients are equal. Such multivectors having all equal coefficients have no inverse and the geometric product of such multivectors having all equal coefficients with another multivector has no inverse. As discussed in more detail below, the decryption methodology for EDCE systems utilize the inverse of the cryptotext multivector being decrypted and of the security key(s) multivector to perform the decryption. Therefore, the cryptotext multivector being decrypted should not have all equal value coefficients. One means to ensure that the cryptotext multivector being decrypted does not have all equal value coefficients is to have the packing/coefficient distribution method ensure that not all coefficients are equal to each other (i.e., at least one coefficient should be different than the other coefficients) when creating the shared security multivector(s) and the data message multivectors. For an embodiment of the EDGE that simply transfers the data message, ensuring that that not all coefficients are equal to each other when creating the shared security multivector(s) and the data message multivectors will ensure that the cryptotext multivector to be decrypted will not have all equivalent coefficients.

It is not necessary that the distribution (i.e., "packing") of the message multivector ($\overline{M}$) coefficients and the distribution (i.e., "packing") of the shared secret multivector ($\overline{S}_S$) use the same methodology to perform the "packing" process. Consequently, the distribution (i.e., "packing") of the shared secret multivector ($\overline{S}_S$) may be performed in any fashion independent of the distribution (i.e., "packing") of the message multivector ($\overline{M}$) coefficients so long as the distribution (i.e., "packing") method of the shared secret multivector ($\overline{S}_S$) is known and used consistently by the source 202 and destination 204 computing devices as, ultimately, the shared secret multivector ($\overline{S}_S$) used by the source 202 and destination 204 should be equal to each other to ensure that the decryption operations 226 work properly in relation to the encryption 214 operations. Likewise, the distribution (i.e., "packing") of the message multivector ($\overline{M}$) may be performed in any fashion independent of the distribution (i.e., "packing") of the shared secret multivector ($\overline{S}_S$) coefficients so long, as the distribution (i.e., "packing") method of the message multivector ($\overline{M}$) is known and used consistently by the source 202 and destination 204 computing devices as, ultimately, again, using the same "packing" methodology by the source 202 and destination 204 for the message multivector ($\overline{M}$) will ensure that the decryption operations 226 work properly in relation to the encryption 214 operations when converting the message multivector ($\overline{M}$) back to text.

It is noteworthy that the number of potential coefficients is directly related to the size/dimension (N) of the multivectors such that the number of coefficients increases by a factor of 2 (i.e., $2^N$) for each incremental increase in the size/dimension (N) of the multivector. To increase the confusion and/or diffusion of the encryption process disclosed herein, using multivectors of at least two dimensions will provide at least four coefficients to distribute the numeric data of the message (M) and the shared secret ($S_S$). By increasing the number of dimensions (N) of multivectors beyond two-dimension multivectors, the confusion and/or diffusion security characteristics will also be increased due to the additionally available multivector coefficients. Further, with the additionally available coefficients it is also possible to transfer more data in a single multivector message ($\overline{M}$) payload using the additionally available multivector coefficients. Also, the additionally available multivector coefficients may permit including additional feature data in addition to the message data (M) in the additional multivector coefficients, such as, but not limited to: dummy data to increase encryption security, command instructions for additional operations, and configuration data for the additional operations.

At process 214, the source 202 encrypts a cryptotext multivector ($\overline{C}$) as a function of at least one Geometric Algebra geometric product operation on the message multivector ($\overline{M}$) and the shared secret multivector ($\overline{S}_S$). At process 216, the source 202 converts the cryptotext multivector ($\overline{C}$) into cryptotext numeric data (C) in accord with reverse operation of a cryptotext data coefficient distribution algorithm that is known to both the source 202 and the destination 204. While not typical of most encryption systems, an embodiment may also omit process 216 and directly send a representation of the cryptotext multivector ($\overline{C}$) without first converting the cryptotext multivector ($\overline{C}$) into cryptotext numeric data (C). The transmission may be implemented as a series of transfers of the coefficients or as some form of records/packets that define a data structure that carries the coefficient data of the cryptotext multivector ($\overline{C}$). Typically, the various embodiments will include process 216 to convert the cryptotext multivector ($\overline{C}$) into cryptotext numeric data (C) in order to maintain compatibility with legacy and/or third party systems as well as to obtain the additional confusion and diffusion characteristics of encapsulating the cryptotext multivector ($\overline{C}$) coefficients into a single cryptotext numeric data (C) value. If process 216 is used to convert the cryptotext multivector ($\overline{C}$) into cryptotext numeric data (C), it is necessary for any computing device/system that wishes to operate on the cryptotext multivector ($\overline{C}$) to have knowledge of the particular conversion methodology so that computing device/system may properly recreate the cryptotext multivector ($\overline{C}$).

Due to the nature of the geometric product operation of Geometric Algebra, there are many possible variations of the geometric product application that will provide similar degrees of confusion and diffusion. Some, but not all, of the potential geometric product calculations to encrypt the message data (M) include: a geometric product ($\overline{C}=\overline{M}\overline{S}_S$) of the message multivector ($\overline{M}$) and the shared secret multivector ($\overline{S}_S$); geometric product "sandwich" ($\overline{C}=\overline{S}_S\overline{M}\overline{S}_S$); and multivector based Sylvester's equation ($\overline{C}=\overline{S}_S\overline{M}+\overline{M}\overline{S}_S$). At process 218, the source 202 sends the cryptotext numeric data (C) to the destination 204.

At process 220, the destination 204 receives the cryptotext numeric data (C) sent by the source 202. At process 222, the destination distributes the cryptotext numeric data (C) into the cryptotext multivector ($\overline{C}$) using the cryptotext data coefficient distribution algorithm that is known to both the source 202 and the destination 204. For the less typical embodiment, if process 216 to convert the cryptotext multivector ($\overline{C}$) into cryptotext numeric data (C) is omitted, then process 222 is also omitted as the cryptotext multivector ($\overline{C}$) was transmitted directly so there is not a need to convert the cryptotext numeric data (C) back into the cryptotext multivector ($\overline{C}$). At process 224, the destination 204 distributes shared secret numeric value ($S_S$) into shared secret multivector ($\overline{S}_S$) coefficients in the same fashion as was done for the source 202 at process 212. At process 226, the destination decrypts the cryptotext multivector ($\overline{C}$) as a function of at least one Geometric Algebra geometric product operation on the cryptotext multivector ($\overline{C}$) and an inverse ($\overline{S}_S^{-1}$) of the shared secret multivector ($\overline{S}_S$) back into the message multivector ($\overline{M}$). Again, due to the nature of the geometric product operation of Geometric Algebra there are many possible variations of the geometric product application that will provide similar degrees of confusion and diffusion. Some, but not all, of the potential geometric product calculations to decrypt the message data (M) include: a geometric product ($\overline{M}=\overline{C}\overline{S}_S^{-1}$) of said cryptotext multivector ($\overline{C}$) and said inverse ($\overline{S}_S^{-1}$) of said shared secret multivector ($\overline{S}_S$); geometric product "sandwich" ($\overline{M}=\overline{S}_S^{-1}\overline{C}\overline{S}_S^{-1}$); and multivector based Sylvester's equation ($\overline{M}=(\overline{S}_S+\overline{S}_S+\overline{S}_S^{-1}\overline{S}_S\overline{S}_S+\overline{S}_S)^{-1}\overline{C}\overline{S}_S^{-1}(\overline{S}_S^{-1}\overline{C}\overline{S}_S+\overline{C})$ to decrypt). At process 228, the destination 204 converts the message multivector ($\overline{M}$) into the message numeric data (M) in accord with reverse operation of the message data coefficient distribution algorithm of the source 202 at process 210. At process 230, if necessary, the destination 202 converts the numeric message data (M) back into the original alphanumeric text message as a reverse function of the process of the source 202 at step 208 that converted that alphanumeric text to the numeric message data (M) using standard computer character encoding characteristics.

Figure 3A:
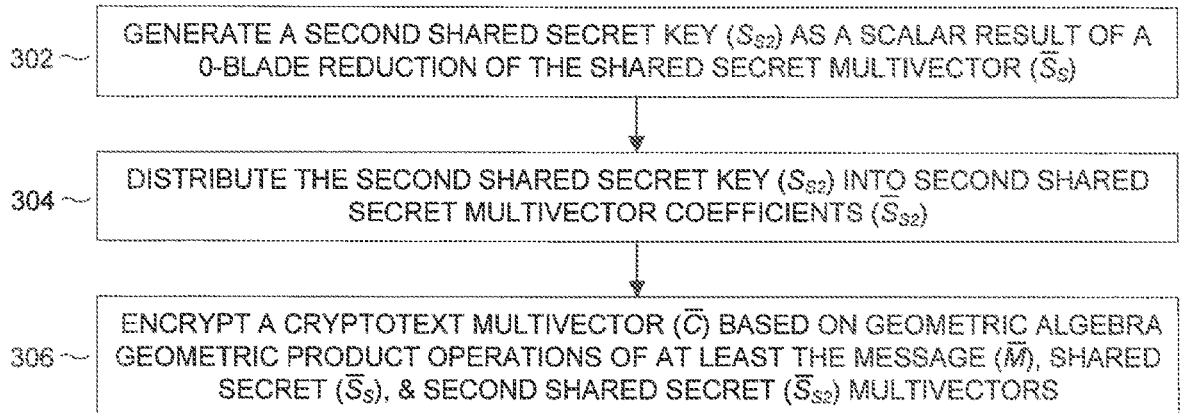
FIG. 3A is a flow chart of the source computing device symmetric key operation for an embodiment.

FIG. 3A is a flow chart 300 of the source computing device symmetric key operation for an embodiment. The encryption process 214 of the source 202 of FIG. 2 may further include processes 302-306 to use symmetric shared secret security keys to further enhance the security of an embodiment. For instance, at process 302, the source computing device may generate/extract/obtain a second shared secret key ($S_{S_2}$) from the original shared secret multivector ($\overline{S}_S$) by performing a 0-Blade Reduction Operation on the original shared secret multivector ($\overline{S}_S$) to obtain a scalar numerical value for the second Shared secret key ($S_{S_2}$). The 0-Blade Reduction Operation may be found as a geometric product ($S_{S_2}=(\overline{S}_S\overline{S}_S)(\overline{S}_S\overline{S}_S)^\dagger$) of the geometric product ($\overline{S}_S\overline{S}_S$) of the original shared secret multivector ($\overline{S}_S$) and a Clifford conjugate ($\overline{S}_S$) of the original shared secret multivector ($\overline{S}_S$) and the geometric reverse (($\overline{S}_S\overline{S}_S$)$^\dagger$) of the geometric product ($\overline{S}_S\overline{S}_S$) of the shared secret multivector ($\overline{S}_S$) and the Clifford conjugate ($\overline{S}_S$) of the original shared secret multivector ($\overline{S}_S$). A further discussion of the 0-Blade Reduction Operation to calculate the second shared secret key ($S_{S_2}$) may be found herein, below.

At process 304, the source computing device distributes the second shared secret key numeric value ($S_{S_2}$) into second shared secret multivector ($\overline{S}_{S_2}$) coefficients where also not all coefficients are equal to each other (i.e., at least one coefficient should be different than the other coefficients). Once again, one skilled in the art will recognize that there are many approaches for distributing numeric data into several coefficients of a multivector (see herein, below, for disclosure of one such distribution method). The primary requirement for the distribution process from the numeric values of the second shared secret key ($S_{S_2}$) to the second shared secret multivector coefficient values ($\overline{S}_{S_2}$) is that the source computing device (of FIG. 3A) and the destination computing device (of FIG. 3B) both know the process 304/314 such that the destination computing device can reconstruct the original message (M) by being able to independently recreate the second shared secret multivector ($\overline{S}_{S_2}$) from the second shared secret key numerical value ($S_{S_2}$). As long as it is known to both the source computing device and the destination computing device, the distribution of numeric data to multivector coefficients may be performed differently between the message (M), the original shared secret ($S_S$), and the second shared secret key ($S_{S_2}$).

At process 306, the source computing device encrypts the cryptotext multivector ($\overline{C}$) as a function of Geometric Algebra geometric product operations on the message multivector ($\overline{M}$), the shared secret multivector ($\overline{S}_S$), and the second shared secret multivector ($\overline{S}_{S_2}$). Again, ($\overline{M}$) to the nature of the geometric product operation of Geometric Algebra there are many possible variations of the geometric product operations that will provide similar degrees of confusion and diffusion. Some, but not all, of the potential geometric product calculations to encrypt the message data (M) include: geometric product "sandwich" ($\overline{C}=\overline{S}_S\overline{M}\overline{S}_{S_2}$ to encrypt); and multivector based Sylvester's equation ($\overline{C}=\overline{S}_S\overline{M}+\overline{M}\overline{S}_{S_2}$ to encrypt).

Figure 3B:
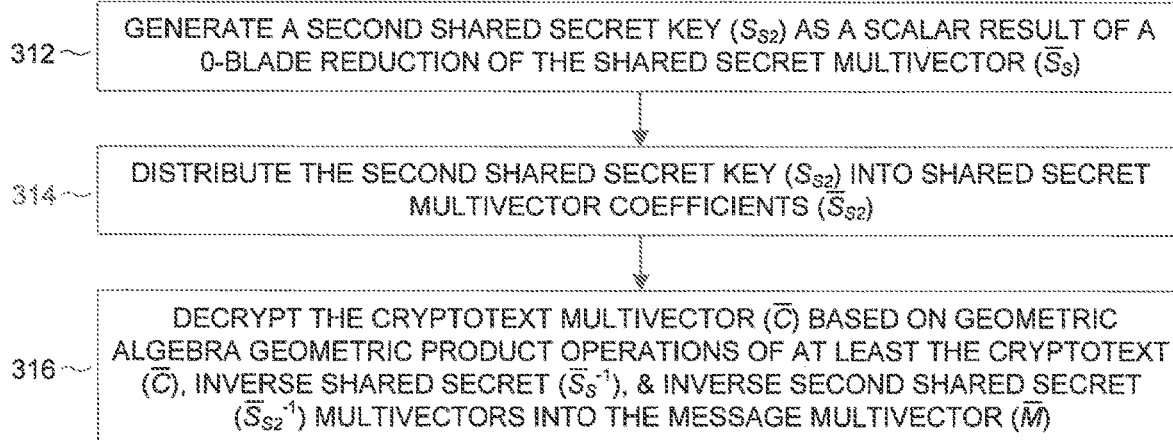
FIG. 3B is a flow chart of the destination computing device symmetric key operation for an embodiment.

FIG. 3B is a flow chart 310 of the destination computing device symmetric key operation for an embodiment. The decryption process 226 of the destination 204 of FIG. 2, in conjunction with the operation of the source computing device as described in the disclosure above with respect to FIG. 3A, may include processes 312-316 to use symmetric shared secret security keys to further enhance the security of an embodiment. At process 312, the destination computing device may independently generate/extract/obtain the second shared secret key ($S_{S_2}$) from the original shared secret multivector ($\overline{S}_S$) by performing the 0-Blade Reduction Operation on the original shared secret multivector ($\overline{S}_S$) to obtain a scalar numerical value for the second shared secret key ($S_{S_2}$). Again, the 0-Blade Reduction Operation may be found as a geometric product ($S_{S_2}=(\overline{S}_S\overline{S}_S)(\overline{S}_S\overline{S}_S)^\dagger$) of the geometric product ($\overline{S}_S\overline{S}_S$) of the original shared secret multivector ($\overline{S}_S$) and a Clifford conjugate ($\overline{S}_S$) of the original shared secret multivector ($\overline{S}_S$) and the geometric reverse (($\overline{S}_S\overline{S}_S$)$^\dagger$) of the geometric product ($\overline{S}_S\overline{S}_S$) of the shared secret multivector ($\overline{S}_S$) and the Clifford conjugate ($\overline{S}_S$) of the original shared secret multivector ($\overline{S}_S$). See also the further discussion of the 0-Blade Reduction Operation to calculate the second shared secret key ($S_{S_2}$), which may be found herein, below.

At process 314, the destination computing device also distributes the second shared secret key numeric value ($S_{S_2}$) into the second shared secret multivector ($\overline{S}_S$) coefficients. Yet again, one skilled in the art will recognize that there are many approaches for distributing numeric data into several coefficients of a multivector (see herein, below, for disclosure of one such distribution method). Again, the primary requirement for the distribution process from the numeric values of the second shared secret key ($S_{S_2}$) to the second shared secret multivector coefficient values ($\overline{S}_{S_2}$) is that the source computing device (of FIG. 3A) and the destination computing device (of FIG. 3B) both know the process 304/314 such that the destination computing device can reconstruct the original message (M) by being able to independently recreate the second shared secret multivector ($\overline{S}_{S_2}$) from the second shared secret key numerical value ($S_{S_2}$). As long as it is known to both the source computing device and the destination computing device, the distribution of numeric data to multivector coefficients may be performed differently between the message (M), the original shared secret ($S_S$), and the second shared secret key ($S_{S_2}$).

At process 316, the destination computing device decrypts the cryptotext multivector ($\overline{C}$) as a function of Geometric Algebra geometric product operations on the cryptotext multivector ($\overline{C}$), an inverse ($\overline{S}_S^{-1}$) of the original shared secret multivector ($\overline{S}_S$), and an inverse ($\overline{S}_{S_2}^{-1}$) of the second shared secret multivector ($\overline{S}_{S_2}$) back into the message multivector ($\overline{M}$). Once again, due to the nature of the geometric product operation of Geometric Algebra there are many possible variations of the geometric product operations that will provide similar degrees of confusion and diffusion. Some, but not all, of the potential geometric product calculations to decrypt the message data (M) include: geometric product "sandwich" ($\overline{M}=\overline{S}_S^{-1}\overline{C}\overline{S}_{S_2}^{-1}$ to decrypt); and multivector based Sylvester's equation ($\overline{M}= (\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt), the selection of which is based on the geometric product calculation used to encrypt the message data (M).

Figure 4A:
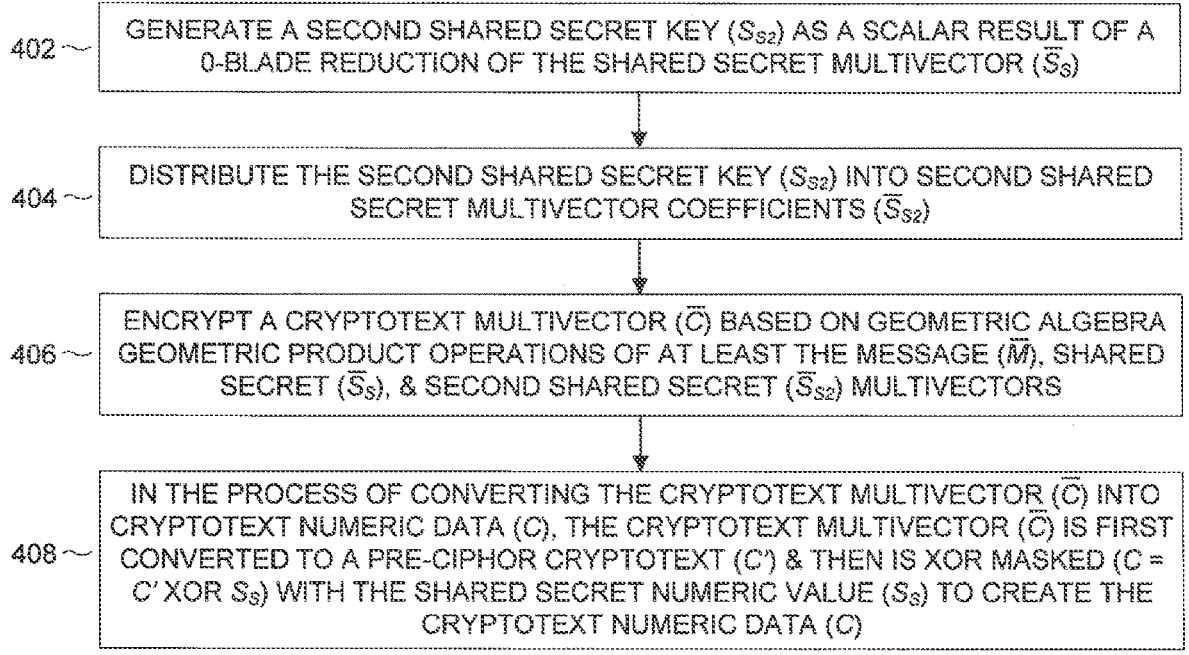
FIG. 4A is a flow chart of the source computing device symmetric key and cryptotext masking operation for an embodiment.

FIG. 4A is a flow chart 400 of the source computing device symmetric key and cryptotext masking operation for an embodiment. Similar to the disclosure with respect to FIG. 3A above, the encryption process 214 of the source 202 of FIG. 2 may further include processes 402-406 to use symmetric shared secret security keys to further enhance the security of an embodiment. At process 402, the source computing device may generate/extract/obtain a second shared secret key ($S_{S_2}$) from the original shared secret multivector ($\overline{S}_S$) by performing a 0-Blade Reduction Operation on the original shared secret multivector ($\overline{S}_S$) to obtain a scalar numerical value for the second shared secret key ($S_{S_2}$). The 0-Blade Reduction Operation may be found as a geometric product ($S_{S_2}=(\overline{S}_S\overline{S}_S)(\overline{S}_S\overline{S}_S)^\dagger$) of the geometric product ($\overline{S}_S\overline{S}_S$) of the original shared secret multivector ($\overline{S}_S$) and a Clifford conjugate ($\overline{S}_S$) of the original shared secret multivector ($\overline{S}_S$) and the geometric reverse (($\overline{S}_S\overline{S}_S)^\dagger$) of the geometric product ($\overline{S}_S\overline{S}_S$) of the shared secret multivector ($\overline{S}_S$) and the Clifford conjugate ($\overline{S}_S$) of the original shared secret multivector ($\overline{S}_S$). A further discussion of the 0-Blade Reduction Operation to calculate the second shared secret key ($S_{S_2}$) may be found herein, below.

At process 404, the source computing device distributes the second shared secret key numeric value ($S_{S_2}$) into second shared secret multivector ($\overline{S}_{S_2}$) coefficients where also not all coefficients are equal to each other (i.e., at least one coefficient should be different than the other coefficients). Once again, one skilled in the art will recognize that there are many approaches for distributing numeric data into several coefficients of a multivector (see herein, below, for disclosure some such distribution methods). The primary requirement for the distribution process from the numeric values of the second shared secret key ($S_{S_2}$) to the second shared secret multivector coefficient values ($\overline{S}_{S_2}$) is that the source computing device (of FIG. 4A) and the destination computing device (of FIG. 4B) both know the process 404/416 such that the destination computing device can reconstruct the original message (M) by being able to independently recreate the second shared secret multivector ($\overline{S}_{S_2}$) from the second shared secret key numerical value ($S_{S_2}$). As long as it is known to both the source computing device and the destination computing device, the distribution of numeric data to multi vector coefficients may be performed differently between the message (M), the original shared secret ($S_S$), and the second shared secret key ($S_{S_2}$).

At process 406, the source computing device encrypts the cryptotext multivector ($\overline{C}$) as a function of Geometric Algebra geometric product operations on the message multivector ($\overline{M}$), the shared secret multivector ($\overline{S}_S$), and the second shared secret multivector ($\overline{S}_{S_2}$). Again, due to the nature of the geometric product operation of Geometric Algebra there are many possible variations of the geometric product operations that will provide similar degrees of confusion and diffusion. Some, but not all, of the potential geometric product calculations to encrypt the message data (M) include: geometric product "sandwich" ($\overline{C}=\overline{S}_S\overline{M}\overline{S}_{S_2}$ to encrypt); and multivector based Sylvester's equation ($\overline{C}=\overline{S}_S\overline{M}+\overline{M}\overline{S}_{S_2}$ to encrypt).

At process 408, in the process of the source computing device for converting the cryptotext multivector ($\overline{C}$) into cryptotext numeric data (C) (see, fir example, the disclosure above with respect to process 216 of FIG. 2), the cryptotext multivector ($\overline{C}$) is first converted into a pre-cipher cryptotext (C') in accord with reverse operation of a cryptotext data coefficient distribution algorithm that is known to both the source computing device (FIG. 4A) and the destination computing device (FIG. 4B). The pre-cipher cryptotext (C') is then masked as an exclusive or (C=C'XOR $S_S$) of the pre-cipher cryptotext (C') and the original shared secret numeric value ($S_S$) to obtain/create the cryptotext numeric data (C) to send to the destination computing device.

FIG. 4B is a flow chart 410 of the destination computing device symmetric key and cryptotext masking operation for an embodiment. At process 412, in the process of the destination computing device for distributing the cryptotext numeric data (C) into the coefficients for the cryptotext multivector ($\overline{C}$) (see, for example, the disclosure above with respect to process 222 of FIG. 2), is first unmasked through an exclusive or (C'=C XOR $S_S$) of the sent cryptotext numeric data (C) and the original shared secret numeric value ($S_S$) in order to obtain/create the pre-cipher cryptotext numeric data (C') on the destination computing device. The destination computing device then distributes the pre-cipher cryptotext numeric data (C') into the cryptotext multivector ($\overline{C}$) using the cryptotext data coefficient distribution algorithm that is known to both the source and destination computing devices.

The remaining decryption process 226 of the destination 204 of FIG. 2, in conjunction with the operation of the source computing device as described in the disclosure above with respect to FIG. 4A, may include processes 414-418 to use symmetric shared secret security keys to further enhance the security of an embodiment. At process 414, the destination computing device may independently generate/extract/obtain the second shared secret key ($S_{S_2}$) from the original shared secret multivector ($\overline{S}_S$) by performing the 0-Blade Reduction. Operation on the original shared secret multivector ($\overline{S}_S$) to obtain a scalar numerical value for the second shared secret key ($S_{S_2}$). Again, the 0-Blade Reduction Operation may be found as a geometric product ($S_{S_2}=(\overline{S}_S\overline{S}_S)(\overline{S}_S\overline{S}_S)$) of the geometric product ($\overline{S}_S\overline{S}_S$) of the original shared secret multivector ($\overline{S}_S$) and a Clifford conjugate ($\overline{S}_S$) of the original shared secret multivector ($\overline{S}_S$) and the geometric reverse (($\overline{S}_S\overline{S}_S$)†) of the geometric product ($\overline{S}_S\overline{S}_S$) of the shared secret multivector ($\overline{S}_S$) and the Clifford conjugate ($\overline{S}_S$) of the original shared secret multivector ($\overline{S}_S$). See also the further discussion of the 0-Blade Reduction Operation to calculate the second shared secret key ($S_{S_2}$), which may be found herein, below.

At process 416, the destination computing device also distributes the second shared secret key numeric value ($S_{S_2}$) into the second shared secret multivector ($\overline{S}_S$) coefficients. Yet again, one skilled in the art will recognize that there are many approaches for distributing numeric data into several coefficients of a multivector (see herein, below, for disclosure of one such distribution method). Again, the primary requirement for the distribution/packing process from the numeric values of the second shared secret key ($S_{S_2}$) to the second shared secret multivector coefficient values ($\overline{S}_{S_2}$) is that the source computing device (of FIG. 4A) and the destination computing device (of FIG. 4B) both know the process 404/416 such that the destination computing device can reconstruct the original message (M) by being able to independently recreate the second shared secret multivector ($\overline{S}_{S_2}$) from the second shared secret key numerical value ($S_{S_2}$). As long as it is known to both the source computing device and the destination computing device, the distribution of numeric data to multivector coefficients may be performed differently between the message (M), the original shared secret ($S_S$), and the second shared secret key ($S_{S_2}$).

At process 416, the destination computing device decrypts the cryptotext multivector ($\overline{C}$) as a function of Geometric Algebra geometric product operations on the cryptotext multivector ($\overline{C}$), an inverse ($\overline{S}_S^{-1}$) of the original shared secret multivector ($\overline{S}_S$), and an inverse ($\overline{S}_{S_2}^{-1}$) of the second shared secret multivector ($\overline{S}_{S_2}$) back into the message multivector ($\overline{M}$). Once again, due to the nature of the geometric product operation of Geometric Algebra there are many possible variations of the geometric product operations that will provide similar degrees of confusion and diffusion. Some, but not all, of the potential geometric product calculations to decrypt the message data (M) include: geometric product "sandwich" ($\overline{M}=\overline{S}_S^{-1}\overline{C}\overline{S}_{S_2}^{-1}$ to decrypt); and multivector based Sylvester's equation ($\overline{M}=(\overline{S}_S+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt), the selection of which is based on the geometric product calculation used to encrypt the message data (M).

Additionally, while the flow charts and flow chart details described above with respect to FIGS. 2-4 describe a methodology that may be embodied as a method or process, another embodiment may be recognized as a computer system, and/or as a source computer system and a destination computer system, that encrypts data, transfers the data, and decrypts the data by implementing the processes described above with respect to the flow chart and flow chart details of FIGS. 2-4. Further, in describing the computer system, and/or the source computer system and the destination computer system, that encrypts data, transfers the data, and decrypts the data, one, or more, individual processes described above for the methodology may be broken down and represented as a subsystem of the overall encryption computer system. A subsystem of the computer system, and/or the source computer system and the destination computer system, that encrypts data, transfers the data, and decrypts the data may be assigned, in whole or in part, to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

Section 2: Additional Descriptions of EDCE Message Encryption/Decryption

The disclosure below provides a simplified example of the operations and data relationships during the performance of an EDCE, embodiment. The amount of data, the type of data, and the particular data values shown and described in the example are not meant to represent any particular real system, but are provided only for the purpose of showing the operations and data relationships of an embodiment. Further, the embodiments described below are not meant to restrict operations to particular data types, encryption shared secret key exchange techniques, text to numeric and back conversion techniques, and/or number to multivector coefficient assignment techniques.

In addition to the utilization of the Geometric Algebra geometric product as a novel encryption primitive, the various embodiments may be comprised of functional blocks, each of which may be tailored as described according to objectives for scope, capability and security. The following sections provide a mathematical and numerical description of one or more example embodiments of these functional blocks. The numerical results in the examples are generally derived from Geometric Algebra executing in the C programming language.

A. Packing and Unpacking Multivectors
  Contents
  1) Text to Number
  2) Number to text
  3) Multivector data structure
  4) Number to multivector
  5) Multivector to number
  1) Text to Number For the example EDCE embodiment described herein, each text message needs to be converted to a number in order to become a valid operational unit for all EDGE computations. For the embodiments shown herein, the numbers are typically shown in base 10, but the various embodiments may choose other number bases as desired by the system designer. For instance, a hex (base 16) representation may provide particular advantages when dealing with ASCII numerical representations as standard ASCII has a representation based on the numbers 0-127 (i.e., $2^7$), which is one power of two (i.e., hex is $2^8$) less than the typical 8 bits represented by a hex number of xFF. According to the ASCII character-encoding scheme, symbols such as the letters a, b, c and so on, are represented in order formats (such as binary, decimal, octets, hexadecimal, etc.), which are described in the ASCII printable code chart, a table that presents the relationship between formats. So the letters "a," if and "c" in ASCII decimal code are 97, 93 and 99, respectively.

As an example, assume that the plaintext text message is "message." In ASCII decimal code, this is represented as follows:

| m | e | s | s | a | g | e |
|---|---|---|---|---|---|---|
| 109 | 101 | 115 | 115 | 97 | 103 | 101 |

With this relationship between symbols and decimal numbers, the conversion from text to number in base 10, using the text "message", is executed as follows:

The variable n represents the final number of the conversion from text to number. We start defining this variable to zero. So, n=0.

Then we create an array with the ASCII decimal codes for each letter of the message:

text "message"
ASCII_array_from_"message"=[109, 101, 115, 1.15, 97, 103, 101]

This array has a size of 7 elements, thus array size=7
Then, for each value of the array of ASCII characters, in a loop, we will
(i) multiply n by 256 (we chose 256 because it is a power of two greater than the largest number in the ASCII printable code chart, so we are reserving a space of 8 bits, since $2^8=256$)
(ii) sum with the equivalent ASCII decimal code, assigning the result to the same initial a variable, as follows:
For i=0; i<array_size; i++
n=n*256+ascii_array_from_message[i]
Note the details of each iteration below:

```
n = 0                              For i = 3
array = [109, 101, 115, 115, 97, 103,   n = 7169395 * 256 + 115
101]                               n = 1835365235
array_size = 7                     For i = 4
For i = 0                          n = 1835365235 * 256 + 97
n = 0 * 256 + 109                  n = 469853500257
n = 109                            For i = 5
For i = 1                          n = 469853500257 * 256 + 103
n = 109 * 256 + 101                n = 120282496065895
n = 28005                          For i = 6
For i = 2                          n = 120282496065895 * 256 + 101
n = 28005 * 256 + 115              n = 30792318992869221
n = 7169395
```

By performing the above calculation, the final value of a is; 30792318992869221

Thus, the plain text "message" as a number in base 10 is equal to 30792318992869221. Once we have a base 10 number it is possible to perform the calculations described herein for message encryption. If desired, entropy may be added at this step by performing transformations on the ASCII codes, such as addition or modulo operations. No such entropy adding transformations are used in the examples that follow.

2) Number to Text

After performing various calculations, a base 10 number is transmitted and received. From the above example of a message multivector, the coefficients are concatenated to form a number string. The "number to text" conversion process for this number string also uses the ASCII printable code chart, but the recovery routine is different from the "text to number" conversion. The procedure is described below:

We start with the variable s, which is an empty string that will become the final text recovered from the input number, (Note: the symbol " " " " is from the C-language and means empty string)
s=" "
The input number is 30792318992869221.
n=30792318992869221

Now, we perform a loop until n is "emptied", since this number refers to an actual text message. This means the loop will stop when n is equal to zero. In each loop iteration, we will recover, from the last to the first, each ASCII decimal code correspondent to the text that we are retrieving. To do that, we will perform a bitwise AND operation using the value 0xFF (which is 256-1 in hexadecimal format or in base 16). We will convert the code to character symbols and concatenate with the current string, always putting the most recent recovered character in the front of the string. Lastly, we will update the value of n by performing a right shift of 8 bits.

Let's say that the function "get_char" converts the ASCII decimal code to a character symbol.

The procedure is as follows:
while n>0
    s=get_char(n AND 0x*FF*)+s

Note the details of each iteration below:
s=" "
n=70392318992869221
while n>0
    s=get_char(n AND 0xFF)+s

```
Iteration 0:                       Iteration 4:
ascii_code = n AND 0xFF = 101      ascii_code = n AND 0xFF = 115
s = get_char(ascii_code) + s       s = get_char(ascii_code) + s
s = "e"                            s = "ssage"
n = n >> 8                         n = n >> 8
n = 120282496065895                n = 28005
Iteration 1:                       Iteration 5:
ascii_code = n AND 0xFF = 103      ascii_code = n AND 0xFF = 101
s = get_char(ascii_code) + s       s = get_char(ascii_code) + s
s = "ge"                           s = "essage"
n = n >> 8                         n = n >> 8
n = 469853500257                   n = 109
Iteration 2:                       Iteration 6:
ascii_code = n AND 0xFF = 97       ascii_code = n AND 0xFF = 109
s = get_char(ascii_code) + s       s = get_char(asscii_code) + s
s = "age"                          s = "message"
n = n >> 8                         n = n >> 8
n = 1835365235                     n = 0
Iteration 3:
ascii_code = n AND 0xFF = 115
s = get_char(ascii_code) + s
s = "sage"
n = n >> 8
n = 7169395
```

Thus, the number 30792318992869221 is converted to the text string "message," which agrees with the original plaintext.

3) Multivector Data Structure

For the example embodiment discussed herein, any number in base 10 may be a coefficient of a multivector element. A multivector may contain arbitrary data, or data that is a result of a series of operations. A base 10 number may also be represented in multivector form by distributing pieces of this number string to the coefficients in the multivector. Multivectors that are 2D have 4 elements/coefficients available to pack with pieces of this number string, a 3D multivector has 8 elements, and 4D has 16, EDCE, has been demonstrated up to at 7D. A 4D multivector with 16 elements is written as:

$$\overline{A}=a_0+a_1e_1+a_2e_2+a_3e_3+a_4e_4+a_{12}e_{12}+a_{13}e_{13}+a_{14}e_{14}+a_{23}e_{23}+a_{24}e_{24}+a_{34}e_{34}+a_{123}e_{123}+a_{124}e_{124}+a_{134}e_{134}+a_{234}e_{234}+a_{1234}e_{1234}$$

4) Number to Multivector

Given the base 10 number string 30792318992869221, this string may be a single coefficient of, say, a 2D multivector, as follows:

$$0+30792318992869221e_1+e_2+e_{12}$$

EDCE has been demonstrated where the number string distributed to an element of the multivector exceeds 4,000 digits. However, the base 10 number in our example will typically be "distributed" in an ad hoc manner across all the multivector elements, such as:

$$30792+31899e_1+28692e_2+21e_{12}$$

The above distribution is called "number to multivector." For an EDCE embodiment, the method of distributing the number string may be according to any of a variety of algorithms as long as the method is known and used by both the sending and receiving entities. To increase cryptographic "confusion," the distribution algorithm may include shuffling of the assignments to elements, performing functional operations on numbers assigned to elements or changing the algorithm between messages in a conversation. More operations increase encryption entropy.

Again, for the various embodiments, the "payload" may be packed in the values of the scalars and coefficients of the multivector elements. To ensure that EDCE systems may perform properly, it is necessary to have some limitations on the coefficient values chosen for the multivectors. For instance, the Rationalize operation on multivectors yields zero when all multivector coefficients are equal. Such multivectors having all equal coefficients have no inverse and the geometric product of such multivectors having all equal coefficients with another multivector has no inverse. As discussed in more detail below, the decryption methodology for EDCE systems utilize the inverse of the cryptotext multivector being decrypted and of the security key(s) multivector to perform the decryption. Therefore, the cryptotext multivector being decrypted should not have all equal value coefficients. One means to ensure that the cryptotext multivector being decrypted does not have all equal value coefficients is to have the packing/coefficient distribution method ensure that not all coefficients are equal to each other (i.e., at least one coefficient should be different than the other coefficients) when creating the shared security multivector(s) and the data message multivectors. For an embodiment of the EDGE that simply transfers the data message, ensuring that that not all coefficients are equal to each other when creating the shared security multivector(s) and the data message multivectors will ensure that the cryptotext multivector to be decrypted will not have all equivalent coefficients.

Additionally, separate multivectors may be encoded for many purposes, such as a shared secret (defined below), authentication information, and timestamps. In addition to the encryption and decryption of a message, the EDCE multivector format and Geometric Algebra foundation of an EDCE embodiment may enable a single transmission to contain far more than just cryptotext, including dummy data to increase encryption security, command instructions for additional operations, and/or configuration data for the additional operations.

The simple distribution method used in the EDCE embodiment examples below is described as follows: Let the input base 10 number string 30792318992869221. We count the number of digits and determine that the number size is 17 digits. We then determine how to distribute these digits to the elements of a multivector. Considering a multivector of 2D, which has 4 elements, we apply the following equation:

$$ep = \left(\frac{size_{number}}{Number_{elements}}\right) + 1$$

$$ep = \left(\frac{17}{4}\right) + 1 = 5$$

Where ep is "each portion" length.

Now we have the original base 10 number and its size (17), the multivector structure (2D, 8 elements) and the length of each element (5). Now we need to "slice" the base 10 number in order to distribute each part as a coefficient of the new multivector.

Computationally, the procedure is as follows:

| Base 10 number | 30792318992869221 |
|---|---|
| Number size | 17 |
| Number of multivector elements | 4 |
| Each portion length | 5 |
| First element | 30792 |
| Second element | 31899 |
| Third element | 28692 |
| Fourth element | 21 |

This creates the following multivector:

$$30792+31899e_1+28692e_2+21e_{12}$$

A First Alternative "Number to Multivector" Distribution Method:

To increase entropy, the conversion from number to multivector may include an intermediate step of shuffling the digits of the base 10 number representation.

As before, let the base 10 number=30792318992869221, Even though this number has an odd number of digits (17), it can be split into two sequences as follows:

$$n = \underbrace{30792318}_{s_1}\underbrace{992869221}_{s_2}$$

The sequence may be shuffled to n' as:

$$n' = \underbrace{992869221}_{s_2}\underbrace{30792318}_{s_1}$$

Now, n' is 99286922130792318, which is the new number to be distributed to the elements of the multivector $\overline{M}$. The number of hits of n'=57.

The following bitwise operations require a minimum magnitude ($>2^{number\ of\ bits\ in\ n'}$) of the numbers involved in order to correctly generate and recover data. To comply with such a requirement, we need to find an exponent b related to the number of bits n' that has to be a power two. Since the number of bits of n' is equal to 57, we make b equal to the next power of two number, which turns to be 64. Hence we use $2^b=2^{64}$ as the arithmetic parameter for the binary operations.

Compute n":

$$n''=(n'+2^b+s_1)+2^b+s_2$$

$$n''=(99286922130792318+2^{64}+992869221)+2^{64}+30792318$$

$$n''=337855888669609169328039888949068681597027387 40312398462$$

Converting n" to multivector would give the following 2D multivector representation:

$$\overline{M}=337855888669609+169328039888949e_1+68681597027387e_2+40312398462e_{12}$$

To recover the original number from the above multivector, the procedure is as follows:

Since the current multivector is 2D, we will recover the sequences in 2 steps. The number of steps is equal to the number of sequences. For recovering the sequences, we will apply the equations bellow, making use of the binary operators AND and >>(right shift).

$$n''=\text{multivector\_to\_number } (\overline{M})$$

$$n''=337855888669609169320398889490686815970\\2738740312398462$$

Step 1:

$$s_1=n'' \text{ AND } (2^{64}-1)=30792318$$

Step 2:

$$s_2=(n''>>64) \text{ AND } (2^{64-1})=992869221$$

Now, concatenate the sequences to recover the original n=30792318992869221.

A Second Alternative "Number to Multivector" Distribution Method:

Another relationship for packing the coefficients of the multivector is to ensure that the coefficients of the multivector representation of the plaintext numeric message follow a mathematical data organization between the value of the plaintext numeric message and at least one of the values of the coefficients of the multivector representation of the plaintext numeric message where the mathematical operations incorporating the one or more values of the multivector coefficients have a result equal to the original plaintext numeric message value. The mathematical relationship may include: addition of at least one coefficient of the multivector coefficients, subtraction of at least one coefficient of the multivector coefficients, addition of a constant value, subtraction of a constant value, multiplication of at least one coefficient of the multivector coefficients by a constant value, and division of at least one coefficient of the multivector coefficients by a constant value. The location of the various mathematical operations relative to the particular locations of the coefficients in the multivector representation should also be consistently applied to all source numeric data messages converted to a multivector as well as for result multivectors converted to a result numeric data value in a particular encryption/decryption pathway. For example, for a mathematical relationship that includes both addition and subtraction operations, and for a three dimensional multivector which has eight possible coefficients in the multivector representation (e.g., $c_1$, $c_2$, $c_3$, $c_{12}$, $c_{13}$, $c_{23}$, and $c_{123}$, numbered so as to correspond with the unit vector associated with each coefficient), if the coefficients for the $e_2$ and $e_{12}$ unit vectors (i.e., $c_2$ and $c_{12}$) are subtracted in the calculation of the mathematical relationship for a source numeric data message conversion to a multivector, the destination numeric message should also treat the $c_2$ and $c_{12}$ coefficients as being subtracted when doing a multivector to number conversion with the same mathematical relationship. In fact, obtaining a numeric value from the coefficients of a numeric data message multivector "packed" using a mathematical relationship is relatively simple and straight forward. To obtain the numeric data message value, simply perform the mathematical relationship equation for the numeric data message multivector using the values of the multivector coefficients plugged into the mathematical relationship equation, Other than the location of additions and subtractions within the mathematical relationship of the coefficients, the actual values of the coefficients may be selected as desired by a user so long as the mathematical relationship equals the original numeric value being encrypted, One skilled in the art will recognize that there are many, perhaps even an infinite, number of ways to select coefficient values that meet the stated criteria/restrictions and that each of those ways will create a satisfactory EDCE embodiment so long as the stated criteria/restrictions are, in fact, met.

Handling Special Cases:

Regardless of the method of distribution, the leading digit in any coefficient must be non-zero. For example, let the number to be converted to multivector be 30792318990869221. Applying the distribution method shown above would result in:

$$30792+31899e_1+08692e_2+21e_{12}$$

Note the third element=$08692e_2$. The computer will treat this number as 8692. When converting back from multivector to number, instead of 30,792,318,990,869,221 we would have 3,079,231,899,869,221, which is not the same number (commas added only for comparability).

To avoid this outcome, it is necessary to include verification in the algorithm that the first number of a coefficient is non-zero. If it is zero, this number should be placed as the last number in the coefficient of the previous element of the multivector. So, the correct result of the conversion of the number 30792318990869221 to a 2D multivector is:

$$30792+318990e_1+8692e_2+21e_{12}$$

5) Multivector to Number

The distribution method used in the EDCE embodiment examples below is described as follows:

For the distribution (i.e., "packing") method disclosed above for parsing the string representation of a base 10 number to obtain the coefficient values, converting a multivector to a base 10 number is simply the reverse process of concatenating the coefficients of the multivector in order to form a base 10 number.

As an example:

The multivector: $30792+31899e_1+28692e_2+21e_{12}$ becomes: 30792318992869221.

Note that in the core EDCE protocol of some of the example embodiments herein, only base 10 number strings are transmitted, not multivectors, but sending only base 10 number strings is not a requirement for an embodiment. In some embodiments, the number may be sent using a numeric variable representation such as an integer or floating point data type. Further, while not typical of most encryption systems, instead of sending a single cryptotext number (C), an embodiment may also simply skip the step of converting the multivector ($\overline{C}$) into cryptotext numeric data (C), and directly send a representation of the cryptotext multivector ($\overline{C}$) without first converting the cryptotext multivector ($\overline{C}$) into cryptotext numeric data (C). The transmission may be implemented as a series of transfers of the coefficients or as some form of records/packets that define a data structure that carries the coefficient data of the cryptotext multivector ($\overline{C}$). As would be the case for a more typical encryption system, if the process to convert the cryptotext multivector ($\overline{C}$) into cryptotext numeric data (C) is used to convert the cryptotext multivector ($\overline{C}$) into cryptotext numeric data (C), it is necessary for any computing device/system that wishes to operate on the cryptotext multivector ($\overline{C}$) to have knowledge of the particular conversion methodology so that the computing device/system may properly recreate the cryptotext multivector ($\overline{C}$).

B. Shared Secret

A "Shared Secret" is a fundamental element in cryptography. A Shared Secret enables secure communication between two or more parties. For the various embodiments the Shared Secret is a number string of digits that may be packed into a multivector in the manner shown above. The "Shared Secret Multivector" may be used to operate on other multivectors, such as creating the geometric product of the Shared Secret Multivector and the message multivector.

A variety of methods are already in practice to establish the Shared Secret between sources and destinations. As disclosed herein, the conversion of a "Shared Secret" number to a "Shared Secret Multivector" is completely novel. Communication end-point devices may be "pre-conditioned" with a unique identifier (number string) known only to the system administrators. In a public/private key environment such as RSA, the Shared Secret may be encrypted by the source using only the destination's public key. The method used in the examples below is the Diffie-Hellman key exchange protocol. This is a convenient, widely adopted method to establish a number string Shared Secret. However, any method that securely produces a shared number string is suitable for use with the various embodiments.

The Diffie-Hellman protocol uses the multiplicative group of integers modulo p (see, for example, https://en.wikipedia.org/wiki/Multiplicative_group_of_integers_modulo_n), where p is prime (see, for example, https://en.wikipedia.org/wiki/Prime_number), and g is a primitive root modulo p (see, for example, https://en.wikipedia.org/wiki/Primitive_root_modulo_n and https://en.wikipedia.org/wiki/Modular_arithmetic). These two values are chosen in this way to ensure that the resulting shared secret can take on any value from 1 to p−1. A simple example of Diffie-Hellman follows:

Alice and Bob first agree on using the same root modulo p and base g.

Alice chooses a secret integer a (Alice's password) and creates her signature $S_A^0$ as $S_A^0 = g^a \bmod p$ and sends it to Bob. (Note: the superscript 0 is a placeholder for later use, if any)

Similarly, Bob chooses a secret integer b (Bob's password) and creates his signature $S_B^0$ as $S_B^0 = g^b \bmod p$ and sends it to Alice.

Alice and Bob are able to compute the shared secret key $S_S$ as follows:

Alice computes $S_S = (S_B^0)^a \bmod p$

Bob computes $S_S = (S_A^0)^b \bmod p$

The keys computed by Alice and Bob are the same. This is the Shared Secret.

Note that Diffie-Hellman protocol is not limited to negotiating a key shared by only two participants. Any number of users can take part in the agreement by performing iterations of the protocol and exchanging intermediate data.

Numeric Example

Assume the following:

| | |
|---|---|
| Selected and shared prime number p | 8213099374107712258464732114699 |
| Selected and shared base number g | 7730398770530858162207928986033 |
| Alice's secret a | 3259529719693652370948899141544 |
| Bob's secret | 2894733675415687996319317004755 |

To compute $S_A^0$, Alice's public signature and $S_B^0$, Bob's public signature:

$S_A^0 = g^a \bmod p$ $S_B^0 = g^b \bmod p$ $S_A^0 = 4900968658502624023709122603999$ $S_B^0 = 2866392045868499793665216196222$ To compute the shared secret, both Alice and Bob will perform the following equation, which will generate the same value for both, thus the shared secret is reference as $S_S$:

$S_S = S_B^{0^a} \bmod p$ $S_S = S_A^{0^b} \bmod p$ $S_S = 3741010924469205328865901410055$ The shared secret number string above may be distributed as before to create a Shared Secret Multivector:

$\overline{S}_S = 37410109 + 24469205 e_1 + 32886590 e_2 + 141005 e_{12}$

In a similar manner the $S_A^0$ and $S_B^0$ number string for Alice and Bob can be distributed in a multivector format to create $\overline{S}_A^0$ and $\overline{S}_B^0$. These multivectors for Alice and Bob are essential to the additional EDCE security features discussed in Section 2.

C. Cryptotext Creation

The cryptotext is created using the EDGE primitive which is the geometric product of the Message multivector and one or more other multivectors. In the most basic form, the cryptotext multivector may be the geometric product of the Message multivector and the Shared Secret Multivector.

The procedure is defined as follows, Let the plaintext message be "this is a test." By applying the "text to number" conversion, we will get the plaintext message as the number:

2361031878030638688519054699098996

By applying the "number to multivector" conversion using a 2D multivector structure the plaintext multivector is:

$\overline{M} = 236103187 + 803063868 e_1 + 851905469 e_2 + 9098996 e_{12}$

Using the Shared Secret multivector that was determined above:

$\overline{S}_S = 37410109 + 24469205 e_1 + 32886590 e_2 + 141005 e_{12}$

The cryptotext multivector can be defined as the geometric product:

$\overline{C} = \overline{M} \overline{S}_S$

Using methods for calculating the geometric product of $\overline{M}$ and $\overline{S}_S$ implemented in C programming code, the cryptotext multivector $\overline{C}$ described above is calculated as:

$\overline{C} = 56497963248932053 + 35999076139905242 e_1 + 39525095983837611 e_2 + 5938268771181474 e_{12}$ In order to be transmitted, as a payload, $\overline{C}$ now may be converted to a base 10 number, through the "multivector to number" conversion process described above.

$c_{10} = 56497963248932053359990761399052423952509598383761159382687711814744$

To increase the entropy of the Cryptotext Multivector, the Geometric Product of the Message Multivector may be taken with more than one other multivector or by using the same multivector twice to form a sandwich or by the addition of left and right multivector operations on the same Shared Secret Multivector. Two examples of these types are $\overline{C}=\overline{S}_S\overline{MS}_S$ and $\overline{C}=\overline{S}_S\overline{M}+\overline{MS}_S$. The use of these primitives and their inverse is shown in the flow charts in FIGS. 3 and 4.

Note that there are several alternative methods to construct the Cryptotext Multivector. One alternative is to encrypt the plaintext message using a conventional symmetric cipher such as AES, converting the number string output of that cipher to multivector format and use this multivector in calculating the geometric product with $\overline{S}_S$, which yields $\overline{C}$. This alternative may be practiced during the transition to EDGE within the enterprise to preserve backward compatibility with legacy encryption systems.

D. Decryption

Since Bob has the same shared secret of the source, he can open the cryptotext by performing a geometric product of the cryptotext multivector and the inverse of the shared secret multivector. When Bob receives $C_{10}$, he will apply the appropriate number to multivector conversion to get:

$$\overline{C}=56497963248932053+3599906139905242e_1+39525095983837611e_2+5938268771181474e_{12}$$

To recover the plaintext multivector $\overline{M}$ Bob determines the geometric product of the cryptotext multivector and the inverse of the Shared Secret multivector.

$$\overline{M}=\overline{C}\overline{S}_S^{-1}$$

The method to determine $\overline{S}_S^{-1}$ given $\overline{S}_S$ is described in more detail in Appendix A. It has been computed as:

$$\overline{S}_S^{-1} = 0.00002607307696232708043436064419361619843314747282002768969813 +$$
$$0.0000008254576382902133111810564738782973039080139959893127032222\,e_1 +$$
$$(-0.0000003022013576864948697543940186527310205253158365550580820887)e_2 +$$
$$(-0.000001476164784851810000367564890720274369477622677012150966249)e_3 +$$
$$(-0.0000019791655467270984367152249825796574443141401442106195406229)e_{12} +$$
$$(-0.00000041828975888550267119339850713160699760758015669115157570855)e_{13} +$$
$$(-0.00000284035735548604816280225401518433913770465475305727734285)e_{23} +$$
$$(-0.00000058399229726787265796889780817224702593392912954493277677)e_{123}$$

Thus, $$\overline{M}=236103187+803063868e_1+851905469e_2+9098996e_{12}$$

The multivector $\overline{M}$ is converted to a base 10 number:

$$M_{10}=236103187803063868685519054699098996$$

Finally, this number is converted to text using the "number to text" procedure described above, resulting in:

$$M_{plain\ text}=\text{"this is a test"}$$

E. EDCE Flow Chart (FIGS. 5-6)

Figure 5:
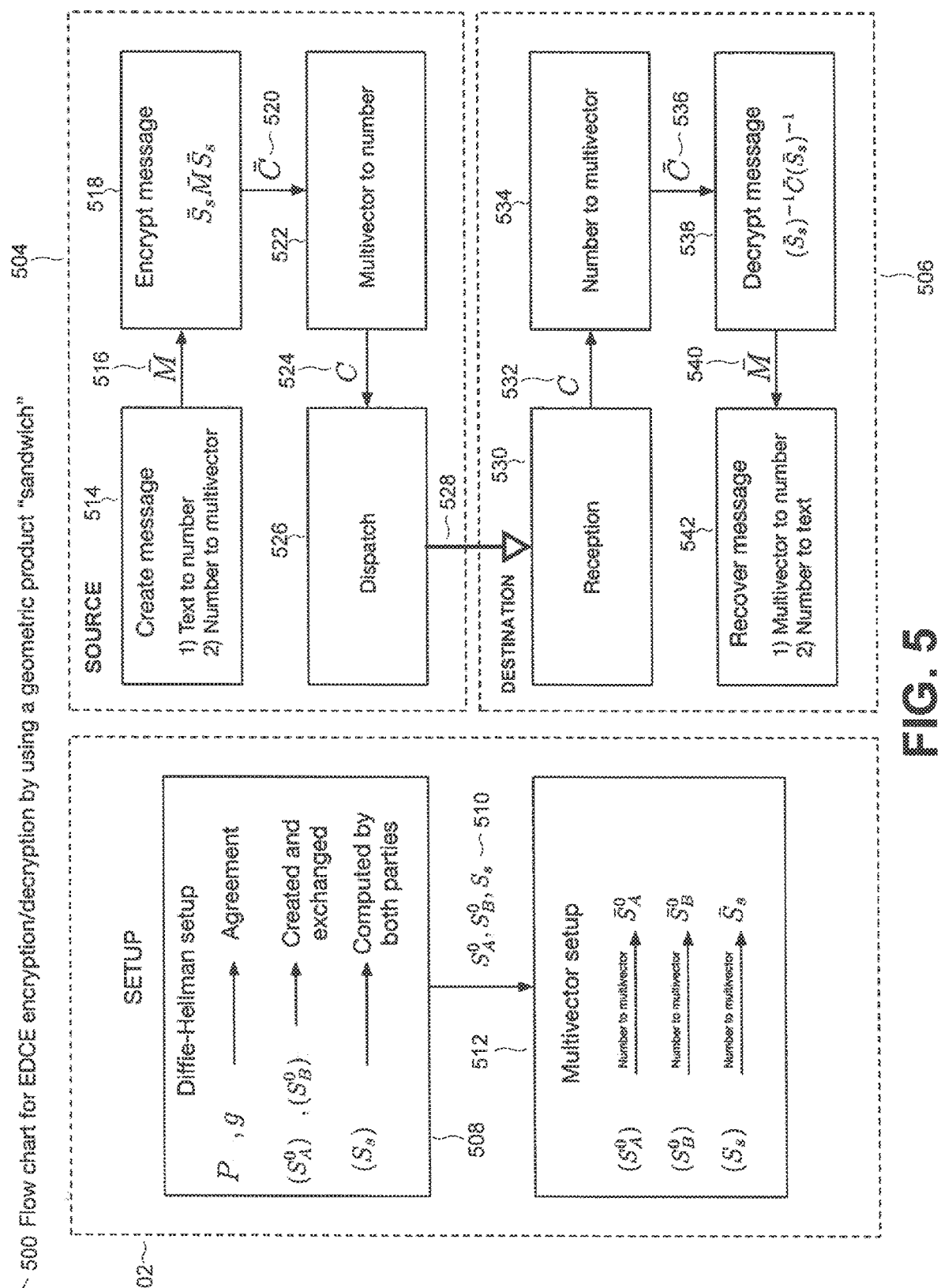
FIG. 5 is a flow chart of an embodiment for the Enhanced Data-Centric Encryption (EDGE) encryption/decryption by using a geometric product "sandwich."
Figure 6:
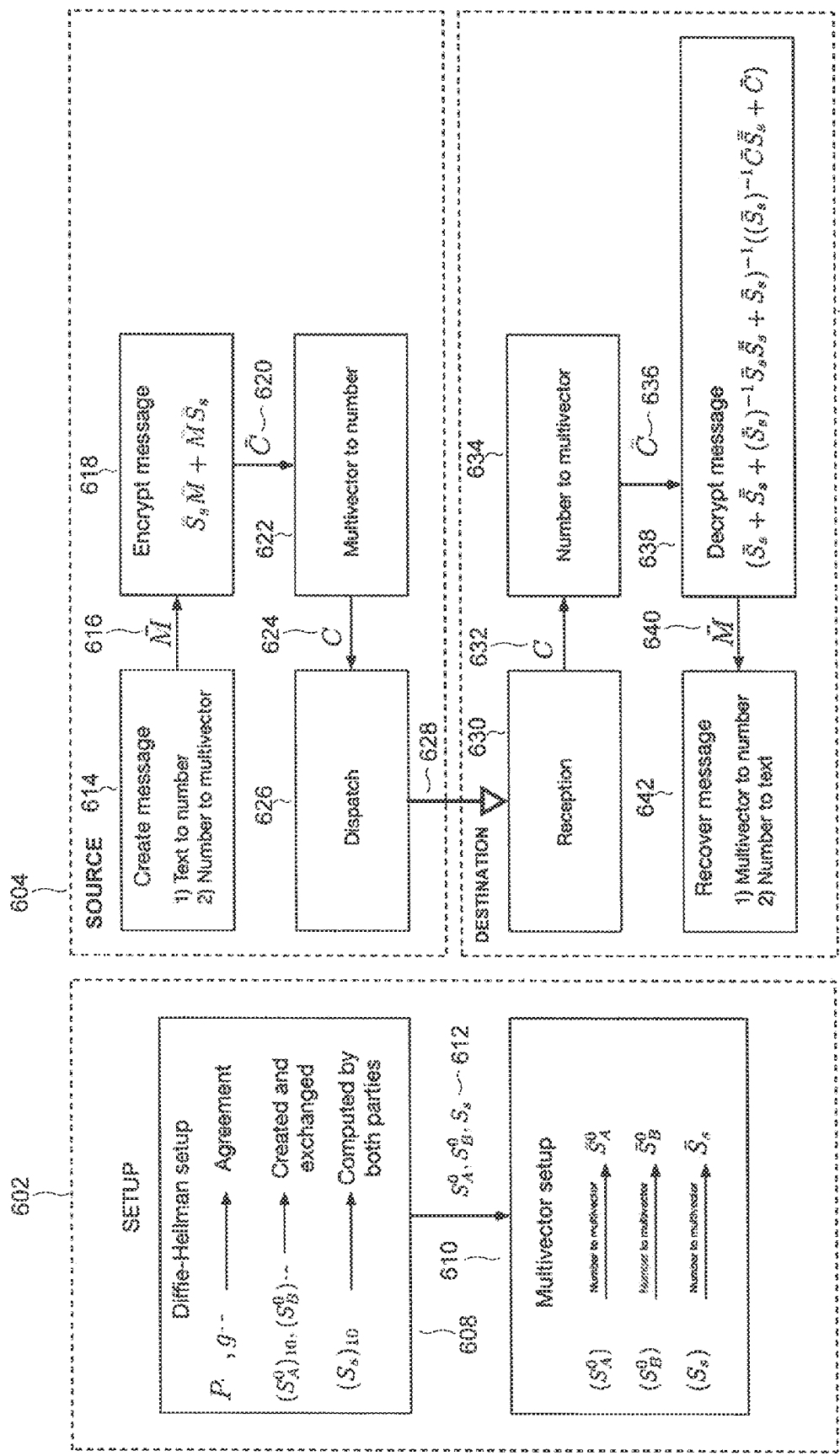
FIG. 6 is a flow chart of an embodiment for the EDCE encryption/decryption by using Sylvester's equation and/or for EKE secure message sequence indexing.

FIG. 5 is a flow chart 500 of an embodiment for an Enhanced Data-Centric Encryption (EDCE) encryption/decryption performed by using a geometric product "sandwich."

Setup (502): The sequence is initiated by establishing the signature and shared secret multivectors. Here the Diffie-Hellman procedure 508 is shown but other asymmetric key ciphers such as RSA may be used to generate a number string known only to the source 504 and the destination 506. Alternatively, end-point devices may be "pre-conditioned" with a secret (number string) known to the system administrator from which the session multivectors may be constructed. The Diffie-Hillman procedure 508 sets up/creates the shared secret keys 510 and then the setup 502 creates multivectors of the Diffie-Hillman keys 510 in the multivector setup 512.

Source (504): The Message Multivector 516 is constructed at the create message operation 514 by concatenating the message ASCII code string to a number string and then distributing that number to the coefficients of the message multivector at 514. The method of distributing to coefficients uses a prescribed algorithm known and used by both the source 504 and the destination 506.

The Message Multivector 516 is then encrypted 518 by computing the geometric product of the message and Shared Secret multivectors. FIG. 5 shows the Cryptotext Multivector 520 as the "sandwich" of geometric products $\overline{C}=\overline{S}_S\overline{MS}_S$. The coefficients of the Cryptotext Multivector 520 are then concatenated into a base 10 number string, C (524), and transmitted through a user-defined dispatch function 526 over an electronic network/bus communication channel 528.

Destination (506): C (532) is received through a user-defined operation 530 and converted back to the Cryptotext Multivector 536 using the prescribed distribution method 534. The destination 506 computes the multivector inverse of the Shared Secret Multivector and uses this result in the decrypt equations 538 such as $\overline{M}=\overline{S}_S^{-1}\overline{CS}_S^{-1}$ to recover the Message Multivector 540. The Message Multivector 540 is then converted to a number string and then to plaintext at 542.

FIG. 6 is a flow chart 600 of an embodiment for the EDGE encryption/decryption by using Sylvester's equation, Setup (602): The sequence is initiated by establishing the signature and shared secret multivectors, here the Diffie-Hellman procedure 608 is shown but other asymmetric key ciphers such as RSA may be used to generate a number string known only to the source 604 and the destination 606. Alternatively, end-point devices may be "pre-conditioned" with a secret (number string) known to the system administrator from which the session multivectors may be constructed. The Diffie-Hillman procedure 608 sets up/creates the shared secret keys 610 and then the setup 602 creates multivectors 612 of the Diffie-Hillman keys in the multivector setup 612.

Source (604): The Message Multivector 616 is constructed at the create message operation 614 by concatenating the message ASCII code string to a number string and then distributing that number to the coefficients of the message multivector at 614, The method of distributing to coefficients uses a prescribed algorithm known and used by both the source 604 and the destination 606.

The Message Multivector 616 is then encrypted 618 by computing the geometric product of the message and Shared Secret multivectors. FIG. 6 shows the Cryptotext Multivector as the sum of two geometric products $\overline{C}=\overline{S}_S\overline{M}+\overline{MS}_S$. The coefficients of the Cryptotext Multivector 620 are then concatenated into a base 10 number string, C (624), and transmitted through a user-defined dispatch function 626 over an electronic network/bus communication channel 628.

Destination (606): C (632) is received through a user-defined operation 630 and converted back to the Cryptotext Multivector 636 using the prescribed distribution method 634. this result in the decrypt equations 638 such as $\overline{M}=(\overline{S}_S+\overline{S}_S+\overline{S}_S^{-1}\overline{S}_S\overline{S}_S+\overline{S}_S)^{-1}(\overline{S}_S^{-1}\overline{CS}_S+\overline{C})$ to decrypt). Where the encryption uses the sum of two geometric products $\overline{C}=\overline{S}_S\overline{M}+\overline{MS}_S$ the decryption applies multivector based "Sylvester's Equation" to recover the Message Multivector 640. The Message Multivector 640 is then converted to a number string and then to plaintext at 642.

F. Symmetric Key Pair Encryption/Decryption from 0-Blade Reduction Operation (FIG. 7) 0-Blade Reduction Operation In order to increase security to the Geometric Algebra encryption primitives, a pair of symmetric shared secret keys may be used instead of a single shared secret key. The following lists the processes that may be used to generate/extract/obtain the second shared secret multivector ($\overline{S}_{S_2}$) from the original shared secret numeric value key ($S_S$).

1. The original shared secret numeric value ($S_S$), which may be obtained from a key exchange procedure, such as, but not limited to, the Diffie-Hellman key exchange process, may be used as the first shared secret numeric key of the pair of symmetric shared secret keys;
2. Using a multivector distribution operation, the original shared secret numeric key ($S_S$) may be loaded into a multivector representation, which may be denoted as ($\overline{S}_S$).
3. A 0-Blade Reduction Operation on the original shared secret multivector ($\overline{S}_S$) may be performed in order to extract/generate/obtain a scalar value that is the second shared secret numeric key ($S_{S_2}$);
4. The scalar that results from 0-Blade Reduction Operation, which has been defined as ($S_{S_2}$), may be loaded into a multivector through another multivector coefficient distribution operation with the resulting multivector being the second shared secret multivector ($\overline{S}_{S_2}$).

Figure 7:
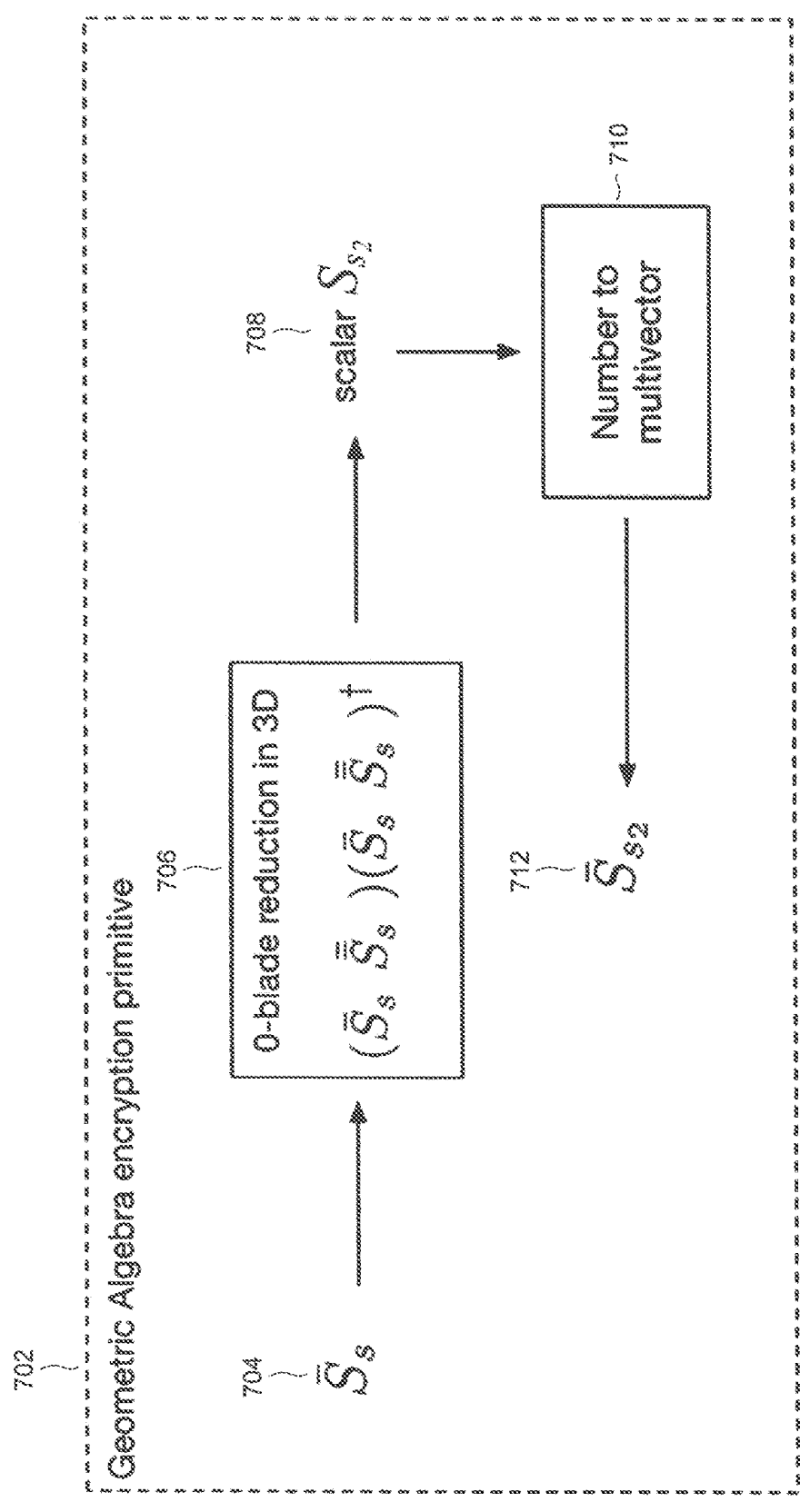
FIG. 7 is a block diagram illustrating generating/extracting/obtaining a second shared secret key from the original shared secret multivector for an embodiment.

FIG. 7 is a block diagram 700 illustrating generating/extracting/obtaining a second shared secret multivector key ($\overline{S}_{S_2}$) 712 from the original shared secret multivector ($\overline{S}_S$) 704 for an embodiment. The original shared secret multivector ($\overline{S}_S$) 704 may be used to encrypt and decrypt data as the first shared secret multivector key of a pair of symmetric shared secret multivector keys. For the Geometric Algebra encryption primitive 702, the original shared secret multivector ($\overline{S}_S$) 704 is operated on by the 0-Blade Reduction Operation 706 ($S_{S_2}=(\overline{S}_S\overline{S}_S)(\overline{S}_S\overline{S}_S)^\dagger$). The 0-Blade Reduction Operation 706 results in the scalar value of the second shared secret numeric key ($S_{S_2}$) 708. A number to multivector coefficient distribution process 710 converts the second shared secret numeric key ($\overline{S}_{S_2}$) into a second shared secret multivector ($\overline{S}_{S_2}$) 712. The second shared secret multivector ($\overline{S}_{S_2}$) may then be used to encrypt and decrypt data as the second shared secret multivector key of a pair of symmetric shared secret multivector keys.

Geometric Algebra Encryption Primitives
Primitive 1—"Sandwich"/Triple Product
Encryption The first encryption primitive can be created through a sequence of geometric products using the pair of keys generated via the 0-Blade Reduction Operation (described herein, above) as follows:

$$\overline{C}=\overline{S}_S\overline{M}\overline{S}_{S_2}$$

Decryption

The decryption process uses the previously defined inverse multivector as follows:

$$\overline{M}=\overline{S}_S^{-1}\overline{C}\overline{S}_{S_2}^{-1}$$

Primitive 2—Multivector based Sylvester's Equation
Encryption

The well-known Sylvester's equation is employed here to generate a second encryption primitive which also uses the pair of symmetric encryption keys generated via the 0-Blade Reduction Operation (described herein, above) as follows:

$$\overline{C}=\overline{S}_S\overline{M}+\overline{MS}_{S_1}$$

Decryption

The decryption operation involves the closed-form solution of the Sylvester's equation for 3-dimensional multivector space as follows:

$$\overline{M}=(\overline{S}_{S_1}+\overline{S}_{S_2}+\overline{S}_S^{-1}\overline{S}_{S_1}\overline{S}_{S_2}+\overline{S}_S)^{-1}(\overline{S}_S^{-1}\overline{CS}_{S_2}+\overline{C})$$

Note that a solution for higher dimensions requires a different formula. Further note that if the original shared secret ($S_S$) is generated using an encrypted/secure key exchange, such as, but not limited to the Diffie-Hellman process discussed in more detail herein, there is no transmission of the original shared secret multivector ($\overline{S}_S$) and, consequently, no transmission of the second shared secret multivector ($\overline{S}_{S_2}$). Still further note that since the second shared secret multivector ($\overline{S}_{S_2}$) is a result of a one-way function, the use of the second shared secret multivector ($\overline{S}_{S_2}$) in either of the Geometric Algebra encryption primitive operations above, further guarantees security.

Numerical Examples for Encryption and Decryption With Doubled Shared-Secret in 3 Dimensions Let the message multivector $\overline{M}$ be:

$$\overline{M}=23+24e_1+19e_2+31e_3+23e_{12}+30e_{13}+21e_{23}+268e_{123}$$

and the original secret multivector $\overline{S}_S$ be:

$$\overline{S}_S=29+27e_1+331e_2+28e_3+23e_{12}+17e_{13}+20e_{23}+215e_{123}$$

From the original secret multivector $\overline{S}_S$, create a scalar by applying a 0Blade Reduction Operation as follows:

$$\text{scalar}=(\overline{S}_S\overline{S}_S)(\overline{S}_S\overline{S}_S)^\dagger$$

$$\text{scalar}=2281454761$$

Then create the second secret multivector $\overline{S}_{S_2}$ converting the scalar to a multivector, as follows:

$$\overline{S}_{S_2}=22+81e_1+45e_2+47e_3+61e_{12}+0e_{13}+0e_{23}0e_{123}$$

Geometric Product "Sandwich" or Geometric Triple Product

In order to encrypt the multivector $\overline{M}$, compute the geometric product "sandwich" as follows:

$$\overline{C}=\overline{S}_S\overline{M}\overline{S}_{S_2}$$

$$\overline{C}=-2797319+(-5355930)e_1+(-3496422)e_2+\\(-3343014)e_3+(-3868508)e_{12}+(-1313899)e_{13}+\\1690341e_{23}+1961527e_{123}$$

and recover the message multivector $\overline{M}$ as follows:

$$\overline{M}=\overline{S}_S^{-1}\overline{C}\overline{S}_{S_2}^{-1}$$

$$\overline{M}=23+24e_1+19e_2+31e_3+23e_{12}+30e_{13}+21e_{23}+268e_{123}$$

Multivector Based Sylvester's Equation

Another way to encrypt the message multivector $\overline{M}$ is by applying the multivector based Sylvester's equation:

$$\overline{C}=\overline{S}_S\overline{M}+\overline{M}\overline{S}_{S_2}$$

$$\overline{C}=-53068+(-5585)e_1+14297e_2+(-27003)e_3+29328e_{12}+(-25163)e_{13}+35753e_{23}+22982e_{123}$$

and recover the message multivector $\overline{M}$ as follows:

$$\overline{M}=(\overline{S}_{S_2}+\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$$

$$\overline{M}=23+24e_1+19e_2+31e_3+23e_{12}+30e_{13}+21e_{23}+268e_{123}$$

G. An Unbreakable Primitive Using Geometric Algebra and Arithmetic Functions Example with Secret Sharing and 3D Multivectors Set Up A multivector may act as a Geometric Algebra object such that components of multi-dimensions and Clifford k-vectors are present. An example is:

$$\overline{M}=a_0+a_1\overline{e}_1+a_2\overline{e}_2+a_3\overline{e}_3+a_{12}\overline{e}_{12}+a_{23}\overline{e}_{23}+a_{31}\overline{e}_{31}+a_{123}\overline{e}_{123}$$

which shows the components:

$a_0 \Rightarrow$ scalar–known as 0-blade or 0-vector $a_1\overline{e}_1+a_2\overline{e}_2+a_3\overline{e}_3 \Rightarrow$ 3D vector or 1-blade or vector $a_{12}\overline{e}_{12}+a_{23}\overline{e}_{23}+a_{31}\overline{e}_{31} \Rightarrow$ 2-blade or bi-vector $a_{123}\overline{e}_{123} \Rightarrow$ 3-blade or tri-vector A typical, but not the only, arithmetic function used for secret sharing is the Diffie-Hellman function, which is based on cyclic groups with element g; for example:

$$S_S=g^{ab} \bmod p$$

where $S_S$ is a shared secret which can be used by both the source and destination sides and where the operation $g^{ab} \bmod p$ yields $S_S$. This is standard in the cyber security field.

Unbreakable Primitive

Given a message M, distribute the numerical content of M over a multivector $\overline{M}$. For example, let M be represented as below:

$$M=m_1,m_2,m_3 \ldots m_n$$

such that $m_i$ is a number that constitutes a placed integer value for a coefficient. Then:

$$\overline{M}=m_0+m_1\overline{e}_1+m_2\overline{e}_2+m_3\overline{e}_3+m_4\overline{e}_{12}+m_6\overline{e}_{23}+m_7\overline{e}_{123}$$

Note that other multivector variations are also possible.

The shared secret $S_S$ is changed to a multivector in the same or a similar manner, such as:

$$S_S=s_{11},s_{12},s_{13} \ldots s_{1n}$$

$$\overline{S}_S=s_{10}+s_{11}\overline{e}_1+s_{12}\overline{e}_2+s_{13}\overline{e}_3+s_{14}\overline{e}_{12}+s_{15}\overline{e}_{13}+s_{16}\overline{e}_{23}+s_{17}\overline{e}_{123}$$

An operation known as "0-Blade Reduction" creates a new scalar from $\overline{S}_S$ as a second shared secret $S_{S_2}$, where:

$$S_{S_2}=(\overline{S}_S\overline{S}_S)(\overline{S}_S\overline{S}_S)^\dagger=\text{scalar}$$

Then $S_{S_2}$ is converted to a multivector, for example:

$$\overline{S}_{S_2}=s_{20}+s_{21}\overline{e}_1+s_{22}\overline{e}_2+s_{23}\overline{e}_3+s_{24}\overline{e}_{12}+s_{25}\overline{e}_{13}+s_{26}\overline{e}_{23}+s_{27}\overline{e}_{123}$$

Finally, the multivector-based Sylvester's equation may be used to create a cipher. Thus, the cryptotext multivector C is:

$$\overline{C}=\overline{S}_S\overline{M}+\overline{M}\overline{S}_{S_2}$$

because $S_{S_2}$ is a result of a one-way function and $S_S$ is a shared secret, which, when operated on by the 0-Blade Reduction Operation (which may sometimes be referenced herein as the function $Z_V(\ )$) becomes a new result embedding a new one-way function.

Up to this point the encryption may have susceptibility to a pair of known cryptotext attacks. However, as shown in part below, the final unbreakability has been achieved.

Encryption Primitives With Unbreakable Cipher:

Primitive 1—"Sandwich"/Triple Product Encryption

The first encryption primitive may be created through a sequence of geometric products using the pair of keys generated via the 0-Blade Reduction Operation (described above) as follows:

$$\overline{C}=\overline{S}_S\overline{M}\overline{S}_{S_2}$$

In order to add another layer of security to the cipher text $\overline{C}$ and guarantee unbreakability against standard cipher analysis, such as the known plain-text attack, it may be helpful to do the following:

The cipher text, originally in multivector form, is converted to a number C'

$$\overline{C} \xrightarrow{\text{multivector to number}} C'$$

yielding a 'pre-cipher' which is denoted here as C',

Then 'mask' this pre-cipher C' by performing an XOR operation with the shared secret $S_S$ $$C=C' \text{XOR } S_S$$

to obtain the final cipher/crypto text C, which is sent to a destination computing device.

Decryption

The decryption process may comprise the following steps:

Receive the cryptotext C at the destination computing device.

Recover the pre-cipher cryptotext C' from the cryptotext C using the shared secret $S_S$, as follows:

$$C'=C \text{ XOR } S_S$$

Convert C' into a multivector yielding the cryptotext multivector $\overline{C}$:

$$C' \xrightarrow{\text{multivector\_to\_number}} \overline{C}$$

Recover the message multivector $\overline{M}$ making use of the inverse multivectors with respect to $\overline{S}_S$ and $\overline{S}_{S_2}$ $$\overline{M}=\overline{S}_S^{-1}\overline{C}\overline{S}_{S_2}^{-1}$$

Primitive 2—Multivector-Based Sylvester's Equation Encryption

The multivector based Sylvester's equation may be employed here to generate a second encryption primitive which also uses the pair of symmetric shared secret keys generated via the 0-Blade Reduction Operation (described above), as follows:

$$\overline{C}=\overline{S}_S\overline{M}+\overline{M}\overline{S}_{S_2}$$

As was done above for the encryption primitive with "sandwich"/triple product, it may be beneficial to add another layer of security by using the same process as described above for XOR masking.

The cipher multivector $\overline{C}$, which is a result of the multivector based Sylvester's equation above, is converted into a number, denoted by C' and defined as a pre-cipher. This number is the information to be sent from the source computing device to the destination computing device.

Decryption

The decryption operation involves the closed-form solution of the multivector based Sylvester's equation for 3-dimensional multivector space and the XOR 'unmask' previously described for the "sandwich"/triple product above. The summarized processes are given below:

Receive the cryptotext C as a number.

Recover the pre-cipher cryptotext C" from cryptotext C using the shared secret $S_S$:

$$C'=C \text{ XOR } S_S$$

Distribute C' into the coefficients of a cryptotext multivector $\overline{C}$:

$$C' \xrightarrow{\text{multivector to number}} \overline{C}$$

The message multivector is recovered using the following closed-form solution for the multivector based Sylvester's equation:

$$\overline{M}=(\overline{S}_{S_2}+\overline{S_{S_2}}+\overline{S}_S^{-1}\overline{S}_{S_2}\overline{S_{S_2}}+\overline{S}_S)^{-1}(\overline{S}_S^{-1}\overline{CS_{S_2}}+\overline{C})$$

Note that a solution for higher dimensions requires a different formula. Further note that if the original shared secret ($S_S$) is generated using an encrypted/secure key exchange, such as, but not limited to the Diffie-Hellman process discussed in more detail herein, there is no transmission of the original shared secret multivector ($\overline{S}_S$) and, consequently, no transmission of the second shared secret multivector ($\overline{S}_{S_2}$). Still further note that since the second shared secret multivector ($\overline{S}_{S_2}$) is a result of a one-way function, the use of the second shared secret multivector ($\overline{S}_{S_2}$) in either of the Geometric Algebra encryption primitive operations above, further guarantees security. Ultimately, as best as can be ascertained, there is no feasible way or high computer power to find $S_S$, $S_{S_2}$ or sequences of such, which can be also dynamically updated in a continuous fashion using other Geometric Algebra operations to further increase security.

Appendix A: Geometric Algebra Overview

Geometric Algebra combines the work of Hamilton (Quartenion) and Grassman (Non-Commutative Algebra) into a field that generalizes the product of two vectors, including the 3-dimensionally restricted "Cross Product" to an n-dimensional subspace of the vector space (V) over number fields ($\mathbb{Z}, \mathbb{R}, \mathbb{C}, \mathbb{N}$, etc.) such that the subspace is a product space that allows two vectors to have a "geometric product" as:

$$\overline{AB}=\overline{A}\cdot\overline{B}+\overline{A}\wedge\overline{B}$$

Where $\overline{A}$ and $\overline{B}$ are vectors or multivectors (i.e.: a collection of "blades" as defined below). The operation $\overline{A}\wedge\overline{B}$ is known as a "wedge product" or "exterior product," The operation $\overline{A}\cdot\overline{B}$ is the "dot product" or "interior product" (aka. "inner product").

For a simple pair of two dimensional vectors:

$$\overline{A}=a_1\overline{e}_1+a_2\overline{e}_2$$

$$\overline{B}=b_1\overline{e}_1+b_2\overline{e}_2$$

where the set $\{\overline{e}_1, \overline{e}_2\}$ are unit basis vectors and $\{a_i\}$, $\{b_i\}$, i=1,2 are scalars, the geometric product follows the rules of Geometric Algebra, as described below:

$$\overline{e}_i \wedge \overline{e}_i = 0$$

$$\overline{e}_i \wedge \overline{e}_j = -\overline{e}_j \wedge \overline{e}_i$$

$$\overline{e}_i \wedge \overline{e}_j = \overline{e}_{ij} \text{ (compact notation)}$$

$$\overline{e}_i \cdot \overline{e}_i = 1$$

$$\overline{e}_i \cdot \overline{e}_j = 0$$

Thus, by performing the geometric product of $\overline{A}$ and $\overline{B}$ we have:

$$\overline{AB} = \left[(a_1 b_1)\overset{\overline{e}_i\cdot\overline{e}_i=1}{\overline{e}_1\cdot\overline{e}_1} + (a_1 b_2)\overset{\overline{e}_i\cdot\overline{e}_j=0}{\overline{e}_1\cdot\overline{e}_2} + (a_2 b_1)\overset{\overline{e}_j\cdot\overline{e}_i=0}{\overline{e}_2\cdot\overline{e}_1} + (a_2 b_2)\overset{\overline{e}_i\cdot\overline{e}_j=1}{\overline{e}_2\cdot\overline{e}_2}\right]_{\text{dot product}} +$$

$$\left[(a_1 b_1)\overset{\overline{e}_i\wedge\overline{e}_i=0}{\overline{e}_1\wedge\overline{e}_1} + (a_1 b_2)\overline{e}_1 \wedge \overline{e}_2 + (a_2 b_1)\overset{\overline{e}_j\wedge\overline{e}_i=-\overline{e}_i\wedge\overline{e}_j}{\overline{e}_2\wedge\overline{e}_1} + (a_2 b_2)\overset{\overline{e}_i\wedge\overline{e}_j=0}{\overline{e}_2\wedge\overline{e}_2}\right]_{\text{wedge product}}$$

Resulting in:

$$\overline{AB}=(a_1 b_1 + a_2 b_2)+(a_1 b_2 - b_1 a_2)\overline{e}_1 \wedge \overline{e}_2$$

The product $\overline{AB}$ produces a scalar and an object $\overline{e}_1 \wedge \overline{e}_2$ which in compact notation is written as $\overline{e}_{12}$ and represents an area created by $\overline{e}_1 \wedge \overline{e}_2$ clockwise rotation or $-\overline{e}_2 \wedge \overline{e}_1$ in anti-clockwise. The orientation is given by the sign of the term in front of the $\overline{e}_1 \wedge \overline{e}_2$ component.

As an example, let $$\overline{A}=-2\overline{e}_1+4\overline{e}_2$$

$$\overline{B}=3\overline{e}_1+5\overline{e}_2$$

Using the rules of Geometric Algebra described above we can compute the geometric product between $\overline{A}$ and $\overline{B}$ as:

$$\overline{A}\overline{B} = [(-2\times 3)\overline{e}_1\cdot\overline{e}_1 + (-2\times 5)\overline{e}_1\cdot\overline{e}_2 + (4\times 3)\overline{e}_2\cdot\overline{e}_1 + (4\times 5)\overline{e}_2\cdot\overline{e}_2]_{\text{dot product}} +$$

$$[(-2\times 3)\overline{e}_1\wedge\overline{e}_1 + (-2\times 5)\overline{e}_1\wedge\overline{e}_2 + (4\times 3)\overline{e}_2\wedge\overline{e}_1 + (4\times 5)\overline{e}_2\wedge\overline{e}_2]_{\text{wedge product}}$$

$$\overline{A}\overline{B} = (-6+20) + (-10\overline{e}_1\wedge\overline{e}_2 + 12\overline{e}_2\wedge\overline{e}_1)$$

$$\overline{A}\overline{B} = (14) + (-10\overline{e}_1\wedge\overline{e}_2 - 12\overline{e}_1\wedge\overline{e}_2)$$

$$\overline{A}\overline{B} = (14) + (-22\overline{e}_1\wedge\overline{e}_2)$$

$$\overline{A}\overline{B} = 14 - 22\overline{e}_{12}$$

Another way of computing the geometric product between multivectors combines the rules of the dot and the wedge products shown above, where we define the following rules when expanding a general geometric product:

$$\overline{e}_i\overline{e}_i=1$$

$$\overline{e}_i\overline{e}_j=-\overline{e}_j\overline{e}_i$$

$$\overline{e}_i\overline{e}_j=\overline{e}_{ij} \text{ (compact notation)}$$

This method is used for computer coding in order to speed up the computation of the geometric product. Using the same multivectors of the previous example and these rules, the geometric product between $\overline{A}$ and $\overline{B}$ is calculated as:

$$\overline{A}\,\overline{B} = (-2\times 3)\underbrace{\overline{e}_1\overline{e}_1}_{\overline{e}_i\overline{e}_i=1} + (-2\times 5)\overline{e}_1\overline{e}_2 + (4\times 3)\overline{e}_2\overline{e}_1 + (4\times 5)\underbrace{\overline{e}_2\overline{e}_2}_{\overline{e}_j\overline{e}_j=1}$$

$$\overline{A}\,\overline{B} = -6 - 10\overline{e}_1\overline{e}_2 + 12\underbrace{\overline{e}_2\overline{e}_1}_{\overline{e}_j\overline{e}_i=-\overline{e}_i\overline{e}_j} + 20$$

$$\overline{A}\,\overline{B} = 14 - 10\overline{e}_1\overline{e}_2 + 12\overline{e}_1\overline{e}_2$$

$$\overline{A}\,\overline{B} = 14 - 22\underbrace{\overline{e}_1\overline{e}_2}_{\overline{e}_i\overline{e}_j=\overline{e}_{ij}} = 14 - 22\overline{e}_{12}$$

Definition of Multivectors and Blades

Another way of describing the objects (or elements) that form a multivector is to use the definition of "blade", or a k-blade. In this convention at k=0, we have a scalar, at k=1 a vector, k=2 a bivector, and so on, A multivector is then formed by:

$$\overline{C} = \langle C \rangle_0 + \langle C \rangle_1 + \langle C \rangle_2 + \ldots + \langle C \rangle_n$$

where n is the dimension of the multivector.

As was shown in the previous example, the Geometric Product of two 1-blade multivectors yields a 0-blade plus 2-blade multivector as a result:

$$\overline{C} = \overline{A}\,\overline{B} = \underbrace{14}_{scalar} - \underbrace{22\overline{e}_{12}}_{bi\text{-}vector}$$

Note that if one wishes to multiply a scalar t by a multivector $\overline{C}$ this would follow a distributive principle giving $$t\overline{C} = t\langle C \rangle_0 + t\langle C \rangle_1 + t\langle C \rangle_2 + \ldots t\langle C \rangle_n$$

For the particular example above one would have:

$$t\overline{C} = t(14 - 22\overline{e}_{12}) = t14 - t22\overline{e}_{12}$$

The dimensionality of a vector or k-blades in general is not restricted or a function of k. For example, we could easily demonstrate the example above with 3-D, 4-D or n-D vectors, such as $\overline{A} = a_1\overline{e}_1 + a_2\overline{e}_2 + a_3\overline{e}_3 + \ldots + a_n\overline{e}_n$, which would yield "hypercubes" as elements of the blades created from the wedge product part of the resulting multivectors.

Multivector Operations

Embodiments may rely in part upon the unique characteristics of Geometric Algebra multivector operations. Key among these operations is:

$$\overline{A}\,\overline{A}^{-1} = 1$$

Where $\overline{A}^{-1}$ is the inverse of $\overline{A}$. There are several important multivector operations that are applied to determine k-blade multivector inversions:

(1) Space inversion, written as $\overline{A}^*$, changes in the orientation of the basis vector as $\overline{e}_k \rightarrow -\overline{e}_k$ yielding the following general blade representation:

$$\overline{A}^* = \langle A\mu_0 - \langle A \rangle_1 + \langle A \rangle_2 + \ldots + (-1)^n \langle A \rangle_n$$

(2) Reverse, written as $\overline{A}^\dagger$, reverses the order of all products such that $\overline{e}_1\overline{e}_2 \ldots \overline{e}_{n-1}\overline{e}_n \rightarrow \overline{e}_n\overline{e}_{n-1} \ldots \overline{e}_2\overline{e}_1$. Note that the order of a scalar or a vector cannot be reversed because it is impossible to reverse the order of one or no things. From the rules of Geometric Algebra above we have $\overline{e}_i\overline{e}_j = -\overline{e}_j\overline{e}_i$, for example. A general blade representation is written as:

$$\overline{A}^\dagger = \langle A \rangle_0 + \langle A \rangle_1 - \langle A \rangle_2 + \ldots + (-1)^{n/2}\langle A \rangle_n$$

(3) Clifford conjugation, written as $\overline{\overline{A}}$, combines the space inversion and the reverse. The general blade representation that defines the Clifford conjugation is written as $$\overline{\overline{A}} = \langle A \rangle_0 - \langle A \rangle_1 - \langle A \rangle_2 + \ldots + (-1)^{n+(n/2)}\langle A \rangle_n$$

The norm of a multivector $\overline{A}$ is defined as $$\|\overline{A}\| = \langle \overline{A}\overline{A}^\dagger \rangle_0^{1/2}$$

where the operator $\langle \ \rangle_0$ pick only the elements of the 0-blade of the resulting vector of the geometric product between $\overline{A}$ and its reverse. It is also the result of the dot product between $\overline{A}$ and its reverse. As an example, define the 2 dimension multivector $$\overline{A} = a_0 + a_1\overline{e}_1 + a_2\overline{e}_2 + a_{12}\overline{e}_{12}$$

The reverse of $\overline{A}$ is:

$$\overline{A}^\dagger = a_0 + a_1\overline{e}_1 + a_2\overline{e}_2 - a_{12}\overline{e}_{12}$$

The norm of $\overline{A}$ is computed from:

$$\overline{A}\,\overline{A}^\dagger = a_0 a_0 + a_0 a_1 \overline{e}_1 + a_0 a_2 \overline{e}_2 - a_0 a_{12} \overline{e}_{12} + a_1 a_0 \overline{e}_1 + a_1 a_1 \underbrace{\overline{e}_1\overline{e}_1}_{=1} +$$

$$a_1 a_2 \underbrace{\overline{e}_1\overline{e}_2}_{=\overline{e}_{12}} - a_1 a_{12} \underbrace{\overline{e}_1\overline{e}_{12}}_{=\overline{e}_1\overline{e}_1\overline{e}_2=\overline{e}_2} + a_2 a_0 \overline{e}_2 + a_2 a_1 \underbrace{\overline{e}_2\overline{e}_1}_{=-\overline{e}_{12}} + a_2 a_2 \underbrace{\overline{e}_2\overline{e}_2}_{=1} -$$

$$a_2 a_{12} \underbrace{\overline{e}_2\overline{e}_{12}}_{=\overline{e}_2\overline{e}_1\overline{e}_2=-\overline{e}_1} + a_{12} a_0 \overline{e}_{12} + a_{12} a_1 \underbrace{\overline{e}_{12}\overline{e}_1}_{=\overline{e}_1\overline{e}_2\overline{e}_1=-\overline{e}_1\overline{e}_1\overline{e}_2=-\overline{e}_2} +$$

$$a_{12} a_2 \underbrace{\overline{e}_{12}\overline{e}_1}_{=\overline{e}_1\overline{e}_2\overline{e}_2=\overline{e}_1} - a_{12} a_{12} \underbrace{\overline{e}_{12}\overline{e}_{12}}_{=\overline{e}_1\overline{e}_2\overline{e}_1\overline{e}_2=-\overline{e}_1\overline{e}_1=-1}$$

$$\overline{A}\,\overline{A}^\dagger = \underbrace{(a_1^2 + a_2^2 + a_3^2 + a_{12}^2)}_{(\overline{A}\,\overline{A}^\dagger)_0} + (a_0 a_1 + a_1 a_0 + a_2 a_{12} + a_{12} a_2)\overline{e}_1 +$$

$$(a_0 a_2 + a_2 a_0 - a_1 a_{12} - a_{12} a_1)\overline{e}_2 + (a_0 a_{12} + a_{12} a_0 + a_1 a_2 - a_2 a_1)\overline{e}_{12}$$

Thus, $$\|\overline{A}\| = \langle \overline{A}\overline{A}^\dagger \rangle_0^{1/2} = \sqrt{a_0^2 + a_1^2 + a_2^2 + a_{12}^2}$$

The amplitude of a 2-blade or 3-blade multivector is computed as:

$$|\overline{A}| = (\overline{A}\,\overline{\overline{A}})^{1/2}$$

As an example consider a 2-blade multivector:

$$\overline{A} = 2 + 5\overline{e}_1 + 3\overline{e}_2 + 8\overline{e}_{12}$$

The Clifford conjugation of $\overline{A}$ is defined as:

$$\overline{\overline{A}} = 2 - 5\overline{e}_1 - 3\overline{e}_2 - 8\overline{e}_{12}$$

The amplitude of $\overline{A}$ can be found by first computing the geometric product $\overline{A}\overline{\overline{A}}$:

$$\overline{A}\overline{\overline{A}} = (2\times 2) + (2\times(-5))\overline{e}_1 + (2\times(-3))\overline{e}_2 + (2\times(-8))\overline{e}_{12} + (5\times 2)\overline{e}_1 +$$

$$(5\times(-5))\underbrace{\overline{e}_1\overline{e}_1}_{=1} + (5\times(-3))\underbrace{\overline{e}_1\overline{e}_2}_{=\overline{e}_{12}} + (5\times(-8))\underbrace{\overline{e}_1\overline{e}_{12}}_{=\overline{e}_1\overline{e}_1\overline{e}_2=\overline{e}_2} + (3\times 2)\overline{e}_2 +$$

$$(3\times(-5))\underbrace{\overline{e}_2\overline{e}_1}_{=-\overline{e}_{12}} + (3\times(-3))\underbrace{\overline{e}_2\overline{e}_2}_{=1} + (3\times(-8))\underbrace{\overline{e}_2\overline{e}_{12}}_{=\overline{e}_2\overline{e}_1\overline{e}_2=-\overline{e}_1} +$$

$$(8\times 2)\overline{e}_{12} + (8\times(-5))\underbrace{\overline{e}_{12}\overline{e}_1}_{=\overline{e}_1\overline{e}_2\overline{e}_1=-\overline{e}_2} +$$

$$(8\times(-3))\underbrace{\overline{e}_{12}\overline{e}_2}_{=\overline{e}_1\overline{e}_2\overline{e}_2=\overline{e}_1} (8\times(-8))\underbrace{\overline{e}_{12}\overline{e}_{12}}_{=\overline{e}_1\overline{e}_2\overline{e}_1\overline{e}_2=-\overline{e}_1\overline{e}_1=-1}$$

$$\overline{A}\overline{\overline{A}} = (4 - 25 - 9 + 64) + (-10 + 10 + 24 - 24)\overline{e}_1 +$$

$$(-6 - 40 + 6 + 40)\overline{e}_2 + (-16 - 15 + 15 + 16)\overline{e}_{12} \overline{A}\overline{\overline{A}} = 34$$

Hence, $$|\overline{A}|=(\overline{AA})^{1/2}=\sqrt{34}$$

Multivector inversion is defined as:

$$\overline{A}^{-1} = \frac{\overline{A}}{|\overline{A}|^2}$$

This gives:

$$\overline{AA}^{-1} = \frac{\overline{AA}}{|\overline{A}|^2} = \frac{|\overline{A}|^2}{|\overline{A}|^2} = 1$$

As an example consider again the multivector $\overline{A}=2+5\overline{e}_1+3\overline{e}_2+8\overline{e}_{12}$ has its inverse computed as:

$$\overline{A}^{-1} = \frac{\overline{A}}{|\overline{A}|^2} = \frac{2-5\overline{e}_1-3\overline{e}_2-8\overline{e}_{12}}{34}$$

Hence, $$\overline{AA}^{-1} = 2+5\overline{e}_1+3\overline{e}_2+8\overline{e}_{12}\frac{2-5\overline{e}_1-3\overline{e}_2-8\overline{e}_{12}}{34}$$

$$\overline{AA}^{-1} =$$
$$\frac{1}{34}\times(4-10\overline{e}_1-6\overline{e}_2-16\overline{e}_{12}+10\overline{e}_1-25\overline{e}_1\overline{e}_1-15\overline{e}_1\overline{e}_2-40\overline{e}_1\overline{e}_{12}+$$
$$6\overline{e}_2-15\overline{e}_2\overline{e}_1-9\overline{e}_2\overline{e}_2-24\overline{e}_2\overline{e}_{12}+$$
$$16\overline{e}_{12}-40\overline{e}_{12}\overline{e}_1-24\overline{e}_{12}\overline{e}_2-64\overline{e}_{12}\overline{e}_{12})$$

$$\overline{AA}^{-1} = \frac{1}{34}\times(4-10\overline{e}_1-6\overline{e}_2-16\overline{e}_{12}+10\overline{e}_1-25\overline{e}_1-15\overline{e}_{12}-40\overline{e}_2+$$
$$6\overline{e}_2-15\overline{e}_{21}-9+24\overline{e}_2\overline{e}_{21}+16\overline{e}_{12}+40\overline{e}_{21}\overline{e}_1-24\overline{e}_1+64\overline{e}_{12}\overline{e}_{21})$$

$$\overline{AA}^{-1} = \frac{1}{34}\times(4-10\overline{e}_1-6\overline{e}_2-16\overline{e}_{12}+10\overline{e}_1-25\overline{e}_1-15\overline{e}_{12}-$$
$$40\overline{e}_2+6\overline{e}_2+15\overline{e}_{12}-9+24\overline{e}_1+16\overline{e}_{12}+40\overline{e}_2-24\overline{e}_1+64)$$

$$\overline{AA}^{-1} = \frac{34}{34} = 1,$$

which being equal to 1, clearly shows that the inverse is thus proven.

For the special case where the multivector reduces to the sub-algebra of 1-blade, the inverse can be also computed using the reverse through the following relationship:

$$\overline{A}^{-1} = \frac{\overline{A}^\dagger}{\|\overline{A}\|^2}$$

For example, consider the multivector:

$$\overline{A}=5\overline{e}_1+3\overline{e}_2+8\overline{e}_3$$

The reverse in this case is:

$$\overline{A}^\dagger=5\overline{e}_1+3\overline{e}_2+8\overline{e}_3$$

which is identical to the original multivector. If we compute the inverse, we have $$\overline{A}^{-1} = \frac{\overline{A}^\dagger}{\|\overline{A}\|^2} = \frac{5\overline{e}_1-3\overline{e}_2-8\overline{e}_3}{98}$$

Because:

$$\overline{AA}^\dagger=25\overline{e}_1\overline{e}_1+15\overline{e}_1\overline{e}_2+40\overline{e}_1\overline{e}_3+15\overline{e}_2\overline{e}_1+9\overline{e}_2\overline{e}_2+24\overline{e}_2\overline{e}_3+40\overline{e}_3\overline{e}_1+24\overline{e}_3\overline{e}_2+64\overline{e}_3\overline{e}_3$$

$$\overline{AA}^\dagger=25+15\overline{e}_{12}-40\overline{e}_{31}-15\overline{e}_{12}+9+24\overline{e}_{23}+40\overline{e}_{31}-24\overline{e}_{23}+64$$

$$\overline{AA}^\dagger=99$$

Thus if we compute $\overline{AA}^{-1}$ we obtain:

$$\overline{AA}^{-1} = (5\overline{e}_1-3\overline{e}_2-8\overline{e}_3)\frac{5\overline{e}_1-3\overline{e}_2-8\overline{e}_3}{98} = \frac{98}{98} = 1$$

For application purposes we wish to have a single formula to compute the inverse and we choose the first option, which uses the Clifford conjugation operation. However, when computing the inverse of a given multivector that is reduced to the even sub-algebra it is possible to obtain a complex-like number from the geometric product between $\overline{AA}$. A common operation in complex number theory is the process of 'rationalizing the denominator' for a complex number in the form $$\frac{1}{x+iy}$$

by multiplying top and bottom by the complex conjugate x−iy which produces a single real valued denominator $$\frac{x-iy}{x^2+y^2}.$$

This process can be duplicated for a multivector where now the reverse operation (†) will play the role of the complex conjugate. This allows us to rewrite the inverse equation for a multivector as follows:

$$\overline{A}^{-1} = \frac{\overline{A}}{|\overline{A}|^2} = \frac{\overline{A}(\overline{AA})^\dagger}{(\overline{AA})(\overline{AA})^\dagger}$$

As an example of the use of this general formula let:

$$\overline{A}=2+3\overline{e}_1+4\overline{e}_2+6\overline{e}_3+7\overline{e}_{12}+8\overline{e}_{23}+9\overline{e}_{31}+10\overline{e}_{123}$$

Its Clifford conjugation is given by:

$$\overline{A}=2-3\overline{e}_1-4\overline{e}_2-6\overline{e}_3-7\overline{e}_{12}-8\overline{e}_{23}-9\overline{e}_{31}+10\overline{e}_{123}$$

Using the properties of geometric product described earlier we compute $\overline{AA}$ to obtain:

$$\overline{AA}=37-34\overline{e}_{123}$$

Using the original inverse formula defined by the Clifford conjugation we would have $$\overline{A}^{-1} = \frac{\overline{A}}{|A|^2} = \frac{\overline{A}}{\overline{A}A} = \frac{2 - 3\overline{e}_1 - 4\overline{e}_2 - 6\overline{e}_3 - 7\overline{e}_{12} - 8\overline{e}_{23} - 9\overline{e}_{31} + 10\overline{e}_{123}}{37 - 34\overline{e}_{123}}$$

This result is clearly a complex-like number, since $(\overline{e}_{123})^2 = i^2 = (\sqrt{-1})^2 = -1$. We rationalize the denominator by performing a geometric product on top and bottom with its reverse $(\overline{AA})^\dagger = 37+34\overline{e}_{123}$ resulting the Mowing:

$$\overline{A}^{-1} = \frac{\overline{A}}{|A|^2} = \frac{\overline{A}(\overline{AA})^\dagger}{(\overline{AA})(\overline{AA})^\dagger}$$

$$\overline{A}^{-1} = \frac{(2 - 3\overline{e}_1 - 4\overline{e}_2 - 6\overline{e}_3 - 7\overline{e}_{12} - 8\overline{e}_{23} - 9\overline{e}_{31} + 10\overline{e}_{123})(37 + 34\overline{e}_{123})}{(37 - 34\overline{e}_{123})(37 + 34\overline{e}_{123})}$$

$$\overline{A}^{-1} = \frac{-266 + 195\overline{e}_1 - 420\overline{e}_2 + 16\overline{e}_3 - 463\overline{e}_{12} - 160\overline{e}_{23} - 435\overline{e}_{31} + 438\overline{e}_{123}}{2525}$$

The use of multivector inverses is important to the various embodiments. The algorithms in Geometric. Algebra used to compute inverses vary according to the space dimension n of the multivector. This overview of Geometric Algebra is not intended to be exhaustive, only sufficient for the discussion of the embodiment features and the examples herein presented. For a more exhaustive reference see [REFERENCE1].

The use of Sylvester's Equation in Sign, Seal, Delivered Messaging

In the method of "signing and sealing" cryptotext we make use of a well-known matrix equation in the field of mathematics called the Sylvester's equation [REFERENCE2], which is given by $$C = AX + XB$$

By knowing the matrices A, B, and C it is possible to calculate a unique solution for the matrix X. For our purposes, we use the analogous definition of the Sylvester's equation for multivectors as shown in [REFERENCE1]

$$\overline{Y} = \overline{AM} + \overline{MB}$$

which is obtained when defining a linear function over multivectors in the form of:

$$F(M) = \sum_{m=1}^{n} \overline{R}_m \overline{M} \overline{S}_m$$

Here the elements of the Sylvester's equation are defined as:

$\overline{C} = \overline{M} =$ Cryptotext
$\overline{S}_A = \overline{A} =$ Source's signature
$\overline{S}_B = \overline{B} =$ Destination's signature
$\overline{P} = \overline{Y}$ "Package" to be sent A solution analogous to the results using quartenions or matrices in [REFERENCE2] is given in [REFERENCE1] as:

$$\overline{M} = (\overline{B} + \overline{B} + \overline{A}^{-1}\overline{BB} + \overline{A})^{-1}(\overline{A}^{-1}\overline{YB} + \overline{Y})$$

and is used by the destination to unpack the cryptotext prior to the decryption process.

[REFERENCE1] "Functions of Multivector Variables," PLOS ONE| DOI:10.1371/journal.pone.0116943 Mar. 16, 2015, James M. Chappell, Azhar Iqbal, Lachlan J. Gunn, Derek Abbott, School of Electrical and Electronic Engineering, University of Adelaide, Adelaide, South Australia, Australia}

[REFERENCE2]Janovska. D, Opfer G (2008) Linear equations in quaternionic variables. Mat Math Ges Hamburg 27:223-234.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended statements of the invention be construed to include other alternative embodiments of the invention except insofar as limited by the prior art.

What is claimed is:

1. A method for the encrypted transfer of numeric message data (M) from a source computing device to a destination computing device, the method comprising:
   distributing by said source computing device said numeric message data (M) into coefficients of a message multivector ($\overline{M}$) in accord with a message data coefficient distribution algorithm that is known to both said source computing device and said destination computing device;
   distributing by said source computing device a shared secret numeric value ($S_S$) into coefficients of a shared secret multivector ($\overline{S}_S$) in accord with a shared secret coefficient distribution algorithm that is known to both said source computing device and said destination computing device, said shared secret numeric value ($S_S$) being known to both said source computing device and said destination computing device but is kept secret from other devices not intended to have access to said numeric message data (M);
   encrypting by said source computing device said message multivector ($\overline{M}$) to create a cryptotext multivector ($\overline{C}$) as a function of at least one Geometric Algebra geometric product operation on said message multivector ($\overline{M}$) and said shared secret multivector ($\overline{S}_S$), wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N);
   sending by said source computing device said cryptotext multivector ($\overline{C}$) to said destination computing device;
   receiving by said destination computing device said cryptotext multivector ($\overline{C}$) sent by said source computing device;
   distributing by said destination computing device said shared secret numeric value ($S_S$) into said shared secret multivector ($\overline{S}_S$) in accord with said shared secret coefficient distribution algorithm;
   decrypting by said destination computing device said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) back into said message multivector ($\overline{M}$), wherein, again, said dimension size (N) of said message multivector ($\overline{M}$) and said shared secret multivector ($\overline{S}_S$) is at least two-dimensions and wherein, again, said number of coefficients for said message multivector ($\overline{M}$) and said shared secret multivector ($\overline{S}_S$) is increased by said factor of two ($2^N$) for each incremental increase in said dimension size (N); and converting by said destination computing device said message multivector ($\overline{M}$) into said numeric message data (M) in accord with reverse operation of said message data coefficient distribution algorithm.

2. The method of claim 1 wherein evaluation of Geometric Algebra geometric products and inverses of multivectors is implemented on said source computing device and said destination computing device using basic arithmetic operations of addition, subtraction, multiplication, and division.

3. The method of claim 2 wherein said implementation of said Geometric Algebra geometric products and inverses of multivectors on said source computing device and said destination computing device does not include a complex operation to select a prime number, to calculate a logarithm function, and/or to calculate a natural logarithm function.

4. The method of claim 1 further comprising:
converting by said source computing device an original alphanumeric text message into said numeric message data (M) as a function of standard computer character encoding characteristics; and
converting by said destination computing device said numeric message data (M) back into said original alphanumeric text message as a function of said standard computer character encoding characteristics.

5. The method of claim 4 wherein said standard computer character encoding characteristics are ASCII (American Standard Code for Information Exchange) codes of text characters of said original alphanumeric text message.

6. The method of claim 1 further comprising establishing said shared secret numeric value ($S_S$) between said source computing device and said destination computing device using a known shared secret technique.

7. The method of claim 6 wherein said known shared secret technique is comprised of at least one of a group chosen from: pre-conditioning said source computing device and said destination computing device with said shared secret numeric value ($S_S$), standard public/private key exchange technique, RSA (Rivest-Shamir-Adleman) key exchange, and Diffie-Hellman key exchange.

8. The method of claim 1 wherein said at least one Geometric Algebra geometric product operation is comprised of at least one of a group chosen from: a geometric product ($\overline{C}=\overline{M}\overline{S}_S$) of said message multivector ($\overline{M}$) and said shared secret multivector ($\overline{S}_S$) to encrypt and a geometric product ($\overline{M}=\overline{C}\overline{S}_S^{-1}$) of said cryptotext multivector ($\overline{C}$) and said inverse ($\overline{S}_S^{-1}$) of said shared secret multivector ($\overline{S}_S$) to decrypt; geometric product $\overline{C}=\overline{S}_S\overline{M}\overline{S}_S$ to encrypt and $\overline{M}=\overline{S}_S^{-1}\overline{C}\overline{S}_S^{-1}$ to decrypt; and multivector based Sylvester's equation $\overline{C}=\overline{S}_S\overline{M}+\overline{M}\overline{S}_S$ to encrypt and $\overline{M}=(\overline{S}_S+\overline{S}_S+\overline{S}_S^{-1}\overline{S}_S\overline{S}_S+\overline{S}_S)^{-1}(\overline{S}_S^{-1}\overline{C}\overline{S}_S+\overline{C})$ to decrypt.

9. The method of claim 1 wherein an increase in said dimension size (N) of said message multivector ($\overline{M}$) and said shared secret multivector ($\overline{S}_S$) beyond two-dimension multivectors increases confusion and/or diffusion security characteristics of said encrypted transfer of said numeric message data from said source computing device to said destination computing device.

10. The method of claim 1 wherein an increase in said dimension size (N) of said message multivector ($\overline{M}$) and said shared secret multivector ($\overline{S}_S$) beyond two-dimension multivectors increases an amount of message data capable of being transferred in a single transfer transaction for said message multivector ($\overline{M}$) such that additional coefficients in said message multivector ($\overline{M}$) hold said increased amount of message data capable of being transferred in a single transfer transaction.

11. The method of claim 1 wherein said dimension size (N) of said message multivector ($\overline{M}$) and said shared secret multivector ($\overline{S}_S$) is greater than two-dimensions and further comprising including additional feature data in said message multivector ($\overline{M}$) for each data transfer such that additional coefficients in said message multivector ($\overline{M}$) that is greater than two-dimensions hold said additional feature data.

12. The method of claim 11 wherein said additional feature data is comprised of at least one of a group chosen from: dummy data to increase encryption security, command instructions for additional operations, and configuration data for said additional operations.

13. The method of claim 1:
wherein said process of encrypting by said source computing device said message multivector ($\overline{M}$) to create said cryptotext multivector ($\overline{C}$) as a function of at least one Geometric Algebra geometric product operation on said message multivector ($\overline{M}$) and said shared secret multivector ($\overline{S}_S$) further comprises:
generating by said source computing device a second shared secret key ($S_{S_2}$) as a scalar result of a 0-Blade Reduction Operation of said shared secret multivector ($\overline{S}_S$);
distributing by said source computing device said second shared secret key ($S_{S_2}$) into coefficients of a second shared secret multivector ($\overline{S}_{S_2}$) in accord with a second shared secret coefficient distribution algorithm that is known to both said source computing device and said destination computing device; and
encrypting by said source computing device said message multivector ($\overline{M}$) to create said cryptotext multivector ($\overline{C}$) as a function of Geometric Algebra geometric product operations on said message multivector ($\overline{M}$), said shared secret multivector ($\overline{S}_S$), and said second shared secret multivector ($\overline{S}_{S_2}$); and
wherein said process of decrypting by said destination computing device said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) back into said message multivector further comprises ($\overline{M}$):
generating by said destination computing device said second shared secret key ($S_{S_2}$) as a scalar result of said 0-Blade Reduction Operation of said shared secret multivector ($\overline{S}_S$);
distributing by said destination computing device said second shared secret key ($S_{S_2}$) into said second shared secret multivector ($\overline{S}_{S_2}$) in accord with said second shared secret coefficient distribution algorithm; and
decrypting by said destination computing device said cryptotext multivector ($\overline{C}$) as a function of Geometric Algebra geometric product operations on said cryptotext multivector ($\overline{C}$), an inverse ($\overline{S}_S^{-1}$) of said shared secret multivector ($\overline{S}_S$), and an inverse ($\overline{S}_{S_2}^{-1}$)

of said second shared secret multivector ($\overline{S}_{S_2}$) back into said message multivector ($\overline{M}$).

14. The method of claim 13 wherein said 0-Blade Reduction Operation is a geometric product ($S_{S_2}=(\overline{S}_S\overline{S}_S)(\overline{S}_S\overline{S}_S)^\dagger$) of a geometric product ($\overline{S}_S\overline{S}_S$) of said shared secret multivector ($\overline{S}_S$) and a Clifford conjugate ($\overline{S}_S$) of said shared secret multivector ($\overline{S}_S$) and a geometric reverse (($\overline{S}_S\overline{S}_S$)$^\dagger$) of said geometric product ($\overline{S}_S\overline{S}_S$) of said shared secret multivector ($\overline{S}_S$) and said Clifford conjugate ($\overline{S}_S$) of said shared secret multivector ($\overline{S}_S$).

15. The method of claim 13 wherein said Geometric Algebra geometric product operations are comprised of at least one of a group chosen from: geometric product $\overline{C}=\overline{S}_S\overline{M}\overline{S}_{S_2}$ to encrypt and $\overline{M}=\overline{S}_S^{-1}\overline{C}\overline{S}_{S_2}^{-1}$ to decrypt; and multivector based Sylvester's equation $\overline{C}=\overline{S}_S\overline{M}+\overline{M}\overline{S}_{S_2}$ to encrypt and $\overline{M}=(\overline{S}_{S_2}+\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt.

16. The method of claim 1 wherein said processes of sending by said source computing device said cryptotext multivector ($\overline{C}$) to said destination computing device and receiving by said destination computing device said cryptotext multivector ($\overline{C}$) sent by said source computing device further comprise:
converting by said source computing device said cryptotext multivector ($\overline{C}$) into cryptotext numeric data (C) in accord with reverse operation of a cryptotext data coefficient distribution algorithm that is known to both said source computing device and said destination computing device;
sending by said source computing device said cryptotext numeric data (C) to said destination computing device;
receiving by said destination computing device said cryptotext numeric data (C) sent by said source computing device; and
distributing by said destination computing device said cryptotext numeric data (C) into said cryptotext multivector ($\overline{C}$) in accord with said cryptotext data coefficient distribution algorithm.

17. The method of claim 16:
wherein said process of encrypting by said source computing device said message multivector ($\overline{M}$) to create said cryptotext multivector ($\overline{C}$) as a function of at least one Geometric Algebra geometric product operation on said message multivector ($\overline{M}$) and said shared secret multivector ($\overline{S}_S$) further comprises:
generating by said source computing device a second shared secret key ($S_{S_2}$) as a scalar result of a 0-Blade Reduction Operation of said shared secret multivector ($\overline{S}_S$);
distributing by said source computing device said second shared secret key ($S_{S_2}$) into coefficients of a second shared secret multivector ($\overline{S}_{S_2}$) in accord with a second shared secret coefficient distribution algorithm that is known to both said source computing device and said destination computing device; and
encrypting by said source computing device said message multivector ($\overline{M}$) to create said cryptotext multivector ($\overline{C}$) as a function of Geometric Algebra geometric product operations on said message multivector ($\overline{M}$), said shared secret multivector ($\overline{S}_S$), and said second shared secret multivector ($\overline{S}_{S_2}$);
wherein said process of converting by said source computing device said cryptotext multivector ($\overline{C}$) into cryptotext numeric data (C) in accord with reverse operation of said cryptotext data coefficient distribution algorithm that is known to both said source computing device and said destination computing device further comprises:
converting by said source computing device said cryptotext multivector ($\overline{C}$) into pre-cipher cryptotext numeric data (C') in accord with reverse operation of said cryptotext data coefficient distribution algorithm that is known to both said source computing device and said destination computing device; and
masking by said source computing device said pre-cipher cryptotext numeric data (C') by an exclusive or (C=C'XOR $S_S$) with said shared secret numeric value ($\overline{S}_S$) to obtain said cryptotext numeric data (C);
wherein said process of distributing by said destination computing device said cryptotext numeric data (C) into said cryptotext multivector ($\overline{C}$) in accord with said cryptotext data coefficient distribution algorithm further comprises:
unmasking by said destination computing device said cryptotext numeric data (C) by an exclusive or (C'=C XOR $S_S$) with said shared secret numeric value ($\overline{S}_S$) to obtain said pre-cipher cryptotext numeric data (C'); and
distributing by said destination computing device said pre-cipher cryptotext numeric data (C') into said cryptotext multivector ($\overline{C}$) in accord with said cryptotext data coefficient distribution algorithm; and
wherein said process of decrypting by said destination computing device said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) back into said message multivector further comprises ($\overline{M}$):
generating by said destination computing device said second shared secret key ($S_{S_2}$) as a scalar result of said 0-Blade Reduction Operation of said shared secret multivector ($\overline{S}_S$);
distributing by said destination computing device said second shared secret key ($S_{S_2}$) into said second shared secret multivector ($\overline{S}_{S_2}$) in accord with said second shared secret coefficient distribution algorithm; and
decrypting by said destination computing device said cryptotext multivector ($\overline{C}$) as a function of Geometric Algebra geometric product operations on said cryptotext multivector ($\overline{C}$), an inverse ($\overline{S}_S^{-1}$) of said shared secret multivector ($\overline{S}_S$), and an inverse ($\overline{S}_{S_2}^{-1}$) of said second shared secret multivector ($\overline{S}_{S_2}$) back into said message multivector ($\overline{M}$).

18. The method of claim 17 wherein said 0-Blade Reduction Operation is a geometric product ($S_{S_2}=(\overline{S}_S\overline{S}_S)(\overline{S}_S\overline{S}_S)^\dagger$) of a geometric product ($\overline{S}_S\overline{S}_S$) of said shared secret multivector ($\overline{S}_S$) and a Clifford conjugate ($\overline{S}_S$) of said shared secret multivector ($\overline{S}_S$) and a geometric reverse (($\overline{S}_S\overline{S}_S$)$^\dagger$) of said geometric product ($\overline{S}_S\overline{S}_S$) of said shared secret multivector ($\overline{S}_S$) and said Clifford conjugate ($\overline{S}_S$) of said shared secret multivector ($\overline{S}_S$).

19. The method of claim 17 wherein said Geometric Algebra geometric product operations are comprised of at least one of a group chosen from: geometric product $\overline{C}=\overline{S}_S\overline{M}\overline{S}_{S_2}$ to encrypt and $\overline{M}=\overline{S}_S^{-1}\overline{C}\overline{S}_{S_2}^{-1}$ to decrypt; and multivector based Sylvester's equation $\overline{C}=\overline{S}_S\overline{M}+\overline{M}\overline{S}_{S_2}$ to encrypt and $\overline{M}=(\overline{S}_{S_2}+\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt.

20. The method of claim 1 wherein numeric values of said numeric message data (M), coefficients of said message multivector ($\overline{M}$), and coefficients of said shared secret multivector ($\overline{S}_S$) are comprised of at least one of a group chosen from: positive numbers, negative numbers, zero, integer numbers, and real numbers.

21. A method for encrypting numeric message data (M) on a source computing device to transfer encrypted data from said source computing device to a destination computing device, the method comprising:

- distributing by said source computing device said numeric message data (M) into coefficients of a message multivector ($\overline{M}$) in accord with a message data coefficient distribution algorithm that is known to both said source computing device and said destination computing device;
- distributing by said source computing device a shared secret numeric value ($S_S$) into coefficients of a shared secret multivector ($\overline{S}_S$) in accord with a shared secret coefficient distribution algorithm that is known to both said source computing device and said destination computing device, said shared secret numeric value ($S_S$) being known to both said source computing device and said destination computing device but is kept secret from other devices not intended to have access to said numeric message data (M);
- encrypting by said source computing device said message multivector ($\overline{M}$) to create a cryptotext multivector ($\overline{C}$) as a function of at least one Geometric Algebra geometric product operation on said message multivector ($\overline{M}$) and said shared secret multivector ($\overline{S}_S$), wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N); and
- sending by said source computing device said cryptotext multivector ($\overline{C}$) to said destination computing device.

22. A method for decrypting a cryptotext multivector ($\overline{C}$), received from a source computing device at a destination computing device, back into numeric message data (M), the method comprising:

- receiving by said destination computing device said cryptotext multivector ($\overline{C}$) sent by said source computing device;
- distributing by said destination computing device a shared secret numeric value ($S_S$) into a shared secret multivector ($\overline{S}_S$) in accord with a shared secret coefficient distribution algorithm that is known to both said source computing device and said destination computing device, said shared secret numeric value ($S_S$) being known to both said source computing device and said destination computing device but is kept secret from other devices not intended to have access to said numeric message data (M);
- decrypting by said destination computing device said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) back into a message multivector ($\overline{M}$), wherein said numeric message data (M) is distributed by said source computing device into coefficients of said message multivector ($\overline{M}$) in accord with a message data coefficient distribution algorithm that is known to both said source computing device and said destination computing device, wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N); and
- converting by said destination computing device said message multivector ($\overline{M}$) into said numeric message data (M) in accord with reverse operation of said message data coefficient distribution algorithm that is known to both said source computing device and said destination computing device.

23. An Enhanced Data-Centric Encryption (EDCE) system for the encrypted transfer of numeric message data (M), the EDCE system comprising:

- a source computing device, wherein said source computing device further comprises:
  - a source numeric message distribution subsystem that distributes said numeric message data (M) into coefficients of a message multivector ($\overline{M}$) in accord with a message data coefficient distribution algorithm that is known to both said source computing device and said destination computing device;
  - a source numeric shared secret distribution subsystem that distributes a shared secret numeric value ($S_S$) into coefficients of a shared secret multivector ($\overline{S}_S$) in accord with a shared secret coefficient distribution algorithm that is known to both said source computing device and said destination computing device, said shared secret numeric value ($S_S$) being known to both said source computing device and said destination computing device but is kept secret from other devices not intended to have access to said numeric message data (M);
  - a source encryption subsystem that encrypts said message multivector ($\overline{M}$) to create a cryptotext multivector ($\overline{C}$) as a function of at least one Geometric Algebra geometric product operation on said message multivector ($\overline{M}$) and said shared secret multivector ($\overline{S}_S$), wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N);
  - a source send subsystem that sends said cryptotext multivector ($\overline{C}$) to said destination computing device; and
- a destination computing device, wherein said destination computing device further comprises:
  - a destination receive subsystem that receives said cryptotext multivector ($\overline{C}$) sent by said source computing device;
  - a destination numeric shared secret distribution subsystem that distributes said shared secret numeric value ($S_S$) into said shared secret multivector ($\overline{S}_S$) in accord with said shared secret coefficient distribution algorithm;
  - a destination decrypt subsystem that decrypts said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) back into said message multivector ($\overline{M}$), wherein, again, said dimension size (N) of said message multivector ($\overline{M}$) and said shared secret multivector ($\overline{S}_S$) is at least two-dimensions and wherein, again, said number of coefficients for said message multivector ($\overline{M}$) and said shared secret multivector ($\overline{S}_S$) is increased by said factor of two ($2^N$) for each incremental increase in said dimension size (N); and a destination convert multivector subsystem that converts said message multivector ($\overline{M}$) into said numeric message data (M) in accord with reverse operation of said message data coefficient distribution algorithm.

24. The EDCE system of claim 23 wherein evaluation of Geometric Algebra geometric products and inverses of multivectors is implemented on said source computing device and said destination computing device using basic arithmetic operations of addition, subtraction, multiplication, and division.

25. The EDCE system of claim 24 wherein said implementation of said Geometric Algebra geometric products and inverses of multivectors on said source computing device and said destination computing device does not include a complex operation to select a prime number, to calculate a logarithm function, and/or to calculate a natural logarithm function.

26. The EDCE system of claim 23: further comprising: wherein said source computing device further comprises a source alphanumeric text conversion subsystem that converts an original alphanumeric text message into said numeric message data (M) as a function of standard computer character encoding characteristics; and wherein said destination computing device further comprises a destination alphanumeric text conversion subsystem that converts said numeric message data (M) back into said original alphanumeric text message as a function of said standard computer character encoding characteristics.

27. The EDCE system of claim 26 wherein said standard computer character encoding characteristics are ASCII (American Standard Code for Information Exchange) codes of text characters of said original alphanumeric text message.

28. The EDCE system of claim 23 wherein said shared secret numeric value ($S_S$) between said source computing device and said destination computing device is established by a known shared secret technique.

29. The EDCE system of claim 28 wherein said known shared secret technique is comprised of at least one of a group chosen from: pre-conditioning said source computing device and said destination computing device with said shared secret numeric value ($S_S$), standard public/private key exchange technique, RSA (Rivest-Shamir-Adleman) key exchange, and Diffie-Hellman key exchange.

30. The EDCE system of claim 23 wherein said at least one Geometric Algebra geometric product operation is comprised of at least one of a group chosen from: a geometric product ($\overline{C}=\overline{MS}_S$) of said message multivector ($\overline{M}$) and said shared secret multivector ($\overline{S}_S$) to encrypt and a geometric product ($\overline{M}=\overline{CS}_S^{-1}$) of said cryptotext multivector ($\overline{C}$) and said inverse ($\overline{S}_S^{-1}$) of said shared secret multivector ($\overline{S}_S$) to decrypt; geometric product $\overline{C}=\overline{S}_S\overline{MS}_S$ to encrypt and $\overline{M}=\overline{S}_S^{-1}\overline{CS}_S^{-1}$ to decrypt; and multivector based Sylvester's equation $\overline{C}=\overline{S}_S\overline{M}+\overline{MS}_S$ to encrypt and $\overline{M}=(\overline{S}_S+\overline{S}_S+\overline{S}_S^{-1}\overline{S}_S\overline{S}_S+\overline{S}_S)^{-1}(\overline{S}_S^{-1}\overline{CS}_S+\overline{C})$ to decrypt.

31. The EDCE system of claim 23 wherein an increase in said dimension size (N) of said message multivector ($\overline{M}$) and said shared secret multivector ($\overline{S}_S$) beyond two-dimension multivectors increases confusion and/or diffusion security characteristics of said encrypted transfer of said numeric message data from said source computing device to said destination computing device.

32. The EDCE system of claim 23 wherein an increase in said dimension size (N) of said message multivector ($\overline{M}$) and said shared secret multivector ($\overline{S}_S$) beyond two-dimension multivectors increases an amount of message data capable of being transferred in a single transfer transaction for said message multivector ($\overline{M}$) such that additional coefficients in said message multivector ($\overline{M}$) hold said increased amount of message data capable of being transferred in a single transfer transaction.

33. The EDCE system of claim 23 wherein said dimension size (N) of said message multivector ($\overline{M}$) and said shared secret multivector ($\overline{S}_S$) is greater than two-dimensions and further comprising including additional feature data in said message multivector ($\overline{M}$) for each data transfer such that additional coefficients in said message multivector ($\overline{M}$) that is greater than two-dimensions hold said additional feature data.

34. The EDCE system of claim 33 wherein said additional feature data is comprised of at least one of a group chosen from: dummy data to increase encryption security, command instructions for additional operations, and configuration data for said additional operations.

35. The EDCE system of claim 23:
wherein said source computing device further comprises:
a source second shared secret key generation subsystem that generates a second shared secret key ($S_{S_2}$) as a scalar result of a 0-Blade Reduction Operation of said shared secret multivector ($\overline{S}_S$); and
a source second numeric shared secret distribution subsystem that distributes said second shared secret key ($S_{S_2}$) into coefficients of a second shared secret multivector ($\overline{S}_{S_2}$) in accord with a second shared secret coefficient distribution algorithm that is known to both said source computing device and said destination computing device;
wherein said source encryption subsystem further encrypts said message multivector ($\overline{M}$) to create said cryptotext multivector ($\overline{C}$) as a function of Geometric Algebra geometric product operations on said message multivector ($\overline{M}$), said shared secret multivector ($\overline{S}_S$), and said second shared secret multivector ($\overline{S}_{S_2}$);
wherein said destination computing device further comprises:
a destination second shared secret key generation subsystem that generates said second shared secret key ($S_{S_2}$) as a scalar result of said 0-Blade Reduction Operation of said shared secret multivector ($\overline{S}_S$); and
a destination second numeric shared secret distribution subsystem that distributes said second shared secret key ($S_{S_2}$) into said second shared secret multivector ($\overline{S}_{S_2}$) in accord with said second shared secret coefficient distribution algorithm; and
wherein said destination decryption subsystem further decrypts said cryptotext multivector ($\overline{C}$) as a function of Geometric Algebra geometric product operations on said cryptotext multivector ($\overline{C}$), an inverse ($\overline{S}_S^{-1}$) of said shared secret multivector ($\overline{S}_S$), and an inverse ($\overline{S}_{S_2}^{-1}$) of said second shared secret multivector ($\overline{S}_{S_2}$) back into said message multivector ($\overline{M}$).

36. The EDCE system of claim 35 wherein said 0-Blade Reduction Operation is a geometric product ($S_{S_2}=(\overline{S}_S\overline{S}_S)(\overline{S}_S\overline{S}_S)^\dagger$) of a geometric product ($\overline{S}_S\overline{S}_S$) of said shared secret multivector ($\overline{S}_S$) and a Clifford conjugate ($\overline{S}_S$) of said shared secret multivector ($\overline{S}_S$) and a geometric reverse (($\overline{S}_S\overline{S}_S)^\dagger$) of said geometric product ($\overline{S}_S\overline{S}_S$) of said shared secret multivector ($\overline{S}_S$) and said Clifford conjugate ($\overline{S}_S$) of said shared secret multivector ($\overline{S}_S$).

37. The EDCE system of claim 35 wherein said Geometric Algebra geometric product operations are comprised of at least one of a group chosen from: geometric product $\overline{C}=\overline{S}_S \overline{M}\overline{S}_{S_2}$ to encrypt and $\overline{M}=\overline{S}_S^{-1}\overline{C}\overline{S}_{S_2}^{-1}$ to decrypt; and multivector based Sylvester's equation $\overline{C}=\overline{S}_S\overline{M}+\overline{M}\overline{S}_{S_2}$ to encrypt and $\overline{M}=(\overline{S}_{S_2}+\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt.

38. The EDCE system of claim 23:
wherein said source send subsystem further comprises:
- a source cryptotext multivector to numeric data subsystem that converts said cryptotext multivector ($\overline{C}$) into cryptotext numeric data (C) in accord with reverse operation of a cryptotext data coefficient distribution algorithm that is known to both said source computing device and said destination computing device; and
- a source send cryptotext numeric data subsystem that sends said cryptotext numeric data (C) to said destination computing device; and wherein said destination receive subsystem further comprises:
- a destination receive cryptotext numeric data subsystem that receives said cryptotext numeric data (C) sent by said source computing device; and
- a destination cryptotext numeric data to multivector subsystem that distributes said cryptotext numeric data (C) into said cryptotext multivector ($\overline{C}$) in accord with said cryptotext data coefficient distribution algorithm.

39. The EDCE system of claim 38:
wherein said source computing device further comprises:
- a source second shared secret key generation subsystem that generates a second shared secret key ($S_{S_2}$) as a scalar result of a 0-Blade Reduction Operation of said shared secret multivector ($\overline{S}_S$); and
- a source second numeric shared secret distribution subsystem that distributes said second shared secret key ($S_{S_2}$) into coefficients of a second shared secret multivector ($\overline{S}_{S_2}$) in accord with a second shared secret coefficient distribution algorithm that is known to both said source computing device and said destination computing device;

wherein said source encryption subsystem further encrypts said message multivector ($\overline{M}$) to create said cryptotext multivector ($\overline{C}$) as a function of Geometric Algebra geometric product operations on said message multivector ($\overline{M}$), said shared secret multivector ($\overline{S}_S$), and said second shared secret multivector ($\overline{S}_{S_2}$);

wherein said source cryptotext multivector to numeric data subsystem further converts said cryptotext multivector ($\overline{C}$) into pre-cipher cryptotext numeric data (C') in accord with reverse operation of said cryptotext data coefficient distribution algorithm that is known to both said source computing device and said destination computing device and masks said pre-cipher cryptotext numeric data (C') by an exclusive or (C=C' XOR $S_S$) with said shared secret numeric value ($S_S$) to obtain said cryptotext numeric data (C);

wherein said destination cryptotext numeric data to multivector subsystem further unmasks said cryptotext numeric data (C) by an exclusive or (C'=C XOR $S_S$) with said shared secret numeric value ($S_S$) to obtain said pre-cipher cryptotext numeric data (C') and distributes said pre-cipher cryptotext numeric data (C') into said cryptotext multivector (C) in accord with said cryptotext data coefficient distribution algorithm wherein said destination computing device further comprises:
- a destination second shared secret key generation subsystem that generates said second shared secret key ($S_{S_2}$) as a scalar result of said 0-Blade Reduction Operation of said shared secret multivector ($\overline{S}_S$); and
- a destination second numeric shared secret distribution subsystem that distributes said second shared secret key ($S_{S_2}$) into said second shared secret multivector ($\overline{S}_{S_2}$) in accord with said second shared secret coefficient distribution algorithm; and wherein said destination decryption subsystem further decrypts said cryptotext multivector ($\overline{C}$) as a function of Geometric Algebra geometric product operations on said cryptotext multivector ($\overline{C}$), an inverse ($\overline{S}_S^{-1}$) of said shared secret multivector ($\overline{S}_S$), and an inverse ($\overline{S}_{S_2}^{-1}$) of said second shared secret multivector ($\overline{S}_{S_2}$) back into said message multivector ($\overline{M}$).

40. The EDCE system of claim 39 wherein said 0-Blade Reduction Operation is a geometric product ($S_S=(\overline{S}_S\overline{S}_S)(\overline{S}_S \overline{S}_S)^\dagger$) of a geometric product ($\overline{S}_S\overline{S}_S$) of said shared secret multivector ($\overline{S}_S$) and a Clifford conjugate ($\overline{S}_S$) of said shared secret multivector ($\overline{S}_S$) and a geometric reverse (($\overline{S}_S\overline{S}_S)^\dagger$) of said geometric product ($\overline{S}_S\overline{S}_S$) of said shared secret multivector ($\overline{S}_S$) and said Clifford conjugate ($\overline{S}_S$) of said shared secret multivector ($\overline{S}_S$).

41. The EDCE system of claim 39 wherein said Geometric Algebra geometric product operations are comprised of at least one of a group chosen from: geometric product $\overline{C}=\overline{S}_S\overline{M}\overline{S}_{S_2}$ to encrypt and $\overline{M}=\overline{S}_S^{-1}\overline{C}\overline{S}_{S_2}^{-1}$ to decrypt; and multivector based Sylvester's equation $\overline{C}=\overline{S}_S\overline{M}+\overline{M}\overline{S}_{S_2}$ to encrypt and $\overline{M}=(\overline{S}_{S_2}+\overline{S}_{S_2}+\overline{S}_S^{-1}\overline{S}_{S_2}\overline{S}_{S_2}+\overline{S}_S)^{-1}(\overline{S}_S^{-1}\overline{C}\overline{S}_{S_2}+\overline{C})$ to decrypt.

42. The EDCE system of claim 23 wherein numeric values of said numeric message data (M), coefficients of said message multivector ($\overline{M}$), and coefficients of said shared secret multivector ($\overline{S}_S$) are comprised of at least one of a group chosen from: positive numbers, negative numbers, zero, integer numbers, and real numbers.

43. An Enhanced Data-Centric Encryption (EDCE) source computing device for encrypting numeric message data (M) to transfer encrypted data from said EDCE source computing device to a destination computing device, the EDCE source computing device comprising:
- a source numeric message distribution subsystem that distributes said numeric message data (M) into coefficients of a message multivector ($\overline{M}$) in accord with a message data coefficient distribution algorithm that is known to both said EDCE source computing device and said destination computing device;
- a source numeric shared secret distribution subsystem that distributes a shared secret numeric value ($S_S$) into coefficients of a shared secret multivector ($\overline{S}_S$) in accord with a shared secret coefficient distribution algorithm that is known to both said EDCE source computing device and said destination computing device, said shared secret numeric value ($S_S$) being known to both said EDCE source computing device and said destination computing device but is kept secret from other devices not intended to have access to said numeric message data (M);
- a source encryption subsystem that encrypts said message multivector ($\overline{M}$) to create a cryptotext multivector ($\overline{C}$) as a function of at least one Geometric Algebra geometric product operation on said message multivector ($\overline{M}$) and said shared secret multivector ($\overline{S}_S$), wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N); and a source send subsystem that sends said cryptotext multivector ($\overline{C}$) to said destination computing device.

44. An Enhanced Data-Centric Encryption (EDCE) destination computing device for decrypting a cryptotext multivector ($\overline{C}$), received from a source computing device at said EDCE destination computing device, back into numeric message data (M), the EDCE destination computing device comprising:

a destination receive subsystem that receives said cryptotext multivector ($\overline{C}$) sent by said source computing device;

a destination numeric shared secret distribution subsystem that distributes a shared secret numeric value ($S_S$) into a shared secret multivector ($\overline{S}_S$) in accord with a shared secret coefficient distribution algorithm that is known to both said source computing device and said EDCE destination computing device, said shared secret numeric value ($S_S$) being known to both said source computing device and said EDCE destination computing device but is kept secret from other devices not intended to have access to said numeric message data (M);

a destination decrypt subsystem that decrypts said cryptotext multivector ($\overline{C}$) as a function of at least one Geometric Algebra geometric product operation on said cryptotext multivector ($\overline{C}$) and an inverse ($\overline{S}_S^{-1}$) of said shared secret multivector ($\overline{S}_S$) into a message multivector ($\overline{M}$), wherein said numeric message data (M) is distributed by said source computing device into coefficients of said message multivector ($\overline{M}$) in accord with a message data coefficient distribution algorithm that is known to both said source computing device and said destination computing device, wherein a dimension size (N) of said message multivector ($\overline{M}$) and said shared secret multivector ($\overline{S}_S$) is at least two-dimensions and wherein a number of coefficients for said message multivector ($\overline{M}$) and said shared secret multivector ($\overline{S}_S$) is increased by a factor of two ($2^N$) for each incremental increase in said dimension size (N); and a destination convert multivector subsystem that converts said message multivector ($\overline{M}$) into said numeric message data (M) in accord with reverse operation of said message data coefficient distribution algorithm that is known to both said source computing device and said EDCE destination computing device.

* * * * *